United States Patent [19]
Taylor et al.

[11] Patent Number: 5,242,578
[45] Date of Patent: Sep. 7, 1993

[54] MEANS FOR AND METHODS OF DEASPHALTING LOW SULFUR AND HYDROTREATED RESIDS

[75] Inventors: James L. Taylor, Naperville, Ill.; Jeffrey J. Kolstad, Wayzata, Minn.; William I. Beaton, Wheaton, Ill.

[73] Assignee: Amoco Corporation, Chicago, Ill.

[21] Appl. No.: 824,289

[22] Filed: Jan. 23, 1992

Related U.S. Application Data

[63] Continuation-in-part of Ser. No. 616,208, Nov. 20, 1990, Pat. No. 5,124,026, Ser. No. 616,218, Nov. 20, 1990, Pat. No. 5,124,027, and Ser. No. 616,219, Nov. 20, 1990, Pat. No. 5,124,025, said Ser. No. 616,208, said Ser. No. 616,218, said Ser. No. 616,219, is a continuation-in-part of Ser. No. 381,372, Jul. 18, 1989, Pat. No. 5,013,427.

[51] Int. Cl.$^5$ .................. C10G 53/04; C10G 53/02
[52] U.S. Cl. .................. 208/309; 208/86; 208/81; 208/89; 208/92; 208/94; 208/144; 208/221; 208/222; 208/314; 208/315; 208/317; 208/339
[58] Field of Search ............ 208/309, 86, 87, 89, 208/92, 94, 144, 220, 221, 222, 314, 315, 317, 339

[56] References Cited

U.S. PATENT DOCUMENTS

| | | | |
|---|---|---|---|
| 4,572,781 | 2/1986 | Krasuk et al. | 208/309 |
| 4,752,376 | 6/1988 | Pachano et al. | 208/86 |
| 4,752,382 | 6/1988 | Eidem | 208/309 |
| 4,810,367 | 3/1989 | Chombart et al. | 208/308 |
| 4,940,529 | 7/1990 | Beaton et al. | 208/86 |
| 5,013,427 | 5/1991 | Mosby et al. | 208/86 |
| 5,024,750 | 6/1991 | Sughrue et al. | 208/86 |

*Primary Examiner*—Helane Myers
*Attorney, Agent, or Firm*—Scott P. McDonald; Thomas T. Tolpin; Frank J. Sroka

[57] ABSTRACT

A refining process uses a two or four stage solvent separator coupled to receive an incoming feedstream of low sulfur resid and a solvent. In the preferred two stage separator, the mixture at the top of the first separator stage is fed to the second stage separator via a heat exchanger. The mixture at the bottom of the first stage separator includes resins and asphaltenes which are fed to a hydrotreater and then, in turn, to a fractionator. The output from the bottom of this fractionator can be fed back to the resid feedstream of the first stage separator for recycled separation. The material at the top of the second stage separator is fed back through the heat exchanger where it helps heat the mixture fed from the top of the first to the second stage separator, this feedback recovers the solvent for reuse in the first stage. The material settling to the bottom of the second stage separator is fed into a catalytic cracker or processed elsewhere.

20 Claims, 9 Drawing Sheets

MEANS FOR AND METHODS OF DEASPHALTING LOW SULFUR AND HYDROTREATED RESIDS

This is a continuation-in-part of Ser. Nos. 07/616,208 now U.S. Pat. No. 5,124,026; 7/616,218 now U.S. Pat. No. 5,124,027; and 07/616,219 now U.S. Pat. No. 5,124,025 each of which was filed Nov. 20, 1990, and each of which, in turn, was a continuation-in-part of Ser. No. 07/381,372 filed Jul. 18, 1989, now U.S. Pat. 5,013,427, issued May 7, 1991.

This invention relates to deasphalting of low sulfur and hydrotreated resids so that they may be used as a feed stream to a resid hydrotreating unit ("RHU").

Some of the figures attached hereto are taken from U.S. Pat. No. 5,013,427. To help the reader, the original reference numerals are retained where ever possible. A companion U.S. Pat. No. is 4,940,529.

DEFINITIONS

The term "asphaltenes" as used herein means a heavy polar fraction and are the residue which remains after the resins and oils have been separated from resid. Asphaltenes from vacuum resid are generally characterized as follows: a Conradson or Ramsbottom carbon residue of 30 to 90 weight % and a hydrogen to carbon (H/C) atomic ratio of 0.5% to less than 1.2%. Asphaltenes can contain from 50 ppm to 5000 ppm vanadium and from 20 ppm to 2000 ppm nickel. The sulfur concentration of asphaltenes can be from 110% to 250% greater than the concentration of sulfur in the resid feed oil to the deasphalter. The nitrogen concentration of asphaltenes can be from 100% to 350% greater than the concentration of nitrogen in the resid feed oil to the deasphalter.

The term "resins" as used herein means resins that are denser or heavier than the deasphalted oil and comprise more aromatic hydrocarbons with highly substituted aliphatic side chains. Resins also comprise metals, such as nickel and vanadium, and comprise more heteroatoms than deasphalted oil. Resins from vacuum resid can be generally characterized as follows: a Conradson or Ramsbottom carbon residue of 10 to less than 30 weight % and a hydrogen to carbon (H/C) atomic ratio of 1.2% to less than 1.5%. Resins can contain 1000 ppm or less of vanadium and 300 ppm or less of nickel. The sulfur concentration in resins can be from 50% to 200% of the contraction of sulfur in the resid oil feed to the deasphalter. The nitrogen concentration in resins can be from 30% to 250% of the concentration of nitrogen in the resid oil feed in the deasphalter.

The term "low sulfur resid" ("LSR") as used herein means a virgin resid comprising less than 2% by weight sulfur. "Virgin resid", as used herein means resid which has not been processed previously. Virgin resid containing sulfur, other than low sulfur resid, is sometimes characterized as "high sulfur resid" ("HSR").

The term "solvent-extracted oil" ("SEO") as used herein means substantially deasphalted, deresined (resin-free) oil which has been separated and obtained from a solvent extraction unit.

The terms "resid oil" and "resid" as used herein mean residual oil.

As used herein, the terms "deasphalting unit" and "deasphalter" mean one or more vessels or other equipment which are used to separate oil, resins, and asphaltenes.

The term "solvent extraction unit" ("SEU") as used herein means a deasphalter in which resid is separated into oil, resins, and asphaltenes by means of one or more solvents.

The term "deasphalted oil" as used herein means oils that are generally the lightest or least dense products produced in a deasphalting unit and comprise saturate aliphatic, alicyclic, and some aromatic hydrocarbons. Deasphalted oil generally comprises less than 30% aromatic carbon and low levels of heteroatoms except sulphur. Deasphalted oil from vacuum resid can be generally characterized as follows: a Conradson or Ramsbottom carbon residue of 1 to less than 12 weight % and a hydrogen to carbon (H/C) ratio of 1.5% to 2%. Deasphalted oil can contain 50 ppm or less, preferably less than 5 ppm, and most preferably less than 2 ppm, of vanadium and 50 ppm or less, preferably less than 5 ppm, and most preferably less than 2 ppm of nickel. The sulfur and nitrogen concentrations of deasphalted oil can be 90% or less of the sulfur and nitrogen concentrations of the resid feed oil to the deasphalter.

Decanted oil ("DCO") is a valuable solvent and is used in the resid hydrotreating unit for controlling the formation of carbonaceous solids therein. However, decanted oil is normally obtained from a catalytic cracking unit and contains cracking catalyst solids or fines therein. These fines are small particles made up of the catalyst used in the catalytic cracking unit.

The term "fine-lean DCO", or "fine-free DCO" as used herein, means decanted oil having less than 20 ppm silica and less than 20 ppm alumina.

BACKGROUND OF THE INVENTION

It is desirable to provide an effective process to increase the yield of gasoline (naphtha) in catalytic cracking units. More particularly, catalytic cracking of oil is an important resid hydrotreating unit process which is used to produce gasoline and other hydrocarbons. During catalytic cracking, a feedstock, which is generally a cut or fraction of crude oil, is cracked in a reactor under catalytic cracking temperatures and pressures while in the presence of a catalyst in order to produce more valuable, lower molecular weight hydrocarbons. Gas oil, which is usually used as a feedstock in catalytic cracking, typically contain from 55% to 80% gas oil by volume, having a boiling range from 650° F. to 1000° F. and less than 1% Ramscarbon by weight. Gas oil feedstocks usually contain less than 5% by volume naphtha and lighter hydrocarbons having a boiling temperature below 430° F., from 10% to 30% by volume diesel and kerosene having a boiling range from 430° F. to 650° F., and less than 10% by volume resid having a boiling temperature above 1000° F.

Known processes catalytically crack virgin unhydrotreated, low sulfur resid as well as deasphalt, subsequently hydrotreat, and catalytically crack high sulfur resid. Furthermore, such prior art processes produce hydrogen-rich asphaltenes which are difficult and expensive to handle, process, and melt (liquefy) at relatively low temperatures. These asphaltenes cannot be used as solid fuel, are difficult to blend into fuel oils, and are not generally usable and desirable for asphalt paving or for use in other products.

Refiners have used deasphalting processes to fractionate low sulfur reside ("LSR") and to enhance the processing of the resulting fractions. Typically, the low sulfur resid is fractionated into an oils fraction and a heavy fraction including resins and asphaltenes. The oils fraction is a desireable feed for a catalytic cracking process because it contains relatively small amounts of metals, nitrogen, and refractory coke-forming compounds. Typical catalytic cracking yield from the oils fraction are similar to those obtained from virgin gas oils. The small amounts of metals and refractory compounds allow large amounts of the oils fraction to be processed in a catalytic cracker ("FCCU") or in a fixed bed hydrotreater followed by catalytical cracking.

The heavy fraction is difficult to process in order to obtain high yields of the lighter, more valuable products. The heavy fraction has a high Ramscarbon content so that the liquid yields from coking this fraction are modest. Therefore, the heavy fraction is often blended into paving asphalt, but its properties make it a poor blending stock. To overcome this blending problem, a portion of the valuable oils fraction is blended with the heavy fraction in order to blend into the asphalt. The heavy stock may also be blended into low value fuel oils, but the poor properties of the heavy fraction limit the amount of that fraction which can be disposed of by this means. Another means of utilizing the heavy fraction are to use it as a low value fuel.

Low sulphur resids are relatively poor feedstocks for a resid hydrotreating processes. In resid hydrotreating, the resid is subjected to a high temperature process in the presence of hydrogen and a hydrogenation catalyst. The objectives of these processes, such as a conventional hydrotreating process, are to remove sulfur, nitrogen, and metals, and to saturate olefins and aromatic compounds. In addition, the resid boils above 1000° F. where it is converted to lighter products, which can be subsequently upgraded in other refining units.

High sulfur resid ("HSR") is significantly more reactive than low sulfur resids in hydrotreating processes. This quality limits the usefulness of the low sulfur resids in hydrotreating processes.

Carbonaceous solids are produced as a by-product of the reaction which occurs during ebullated bed hydrotreating (expanded bed hydrotreating). The ebullating hydrotreating catalyst fines serve as a nucleus and center for carbonaceous solids formation. The situation becomes even more aggravated when two or more hydrotreating reactors are connected in series, as they are in many, if not most, commercial operations. Solids formed in the first reactor not only form nucleation sites for solids growth and agglomeration in the first reactor, but are carried over with the hydrotreated product oil into the second reactor, etc., forming even larger solids growth and agglomeration in the process.

The concentration of carbonaceous solids increases at more severe hydrotreating conditions, at higher temperatures, and at higher resid conversion levels. The amount of carbonaceous solids is dependent on the type of feed. Hence, resid conversion is limited by the formation of carbonaceous solids.

Over the years, a variety of processes and equipment have been suggested for use in various refining operations, such as for upgrading oil, hydrotreating, reducing hydrotreated solids, and catalytic cracking. Typifying some of these prior art processes and equipment are those described in U.S. Pat. Nos. 2,382,282; 2,398,739; 2,398,759; 2,414,002; 2,425,849; 2,436,927; 2,962,222; 2,884,303; 2,900,308; 2,981,676; 2,985,584; 3,004,926; 3,039,953; 3,168,459; 3,338,818; 3,351,548; 3,364,136; 3,513,087; 3,563,911; 3,661,800; 3,766,055; 3,798,157; 3,838,036; 3,844,973; 3,905,892; 3,909,392; 3,923,636; 4,191,636; 4,239,616; 4,290,880; 4,305,814; 4,331,533; 4,332,674; 4,341,623; 4,341,660; 4,354,922; 4,400,264; 4,454,023; 4,486,295; 4,478,705; 4,495,060; 4,502,944; 4,521,295; 4,526,676; 4,592,827; 4,606,809; 4,617,175; 4,618,412; 4,622,210; 4,640,762; 4,655,903; 4,661,265; 4,662,669; 4,692,318; 4,695,370; 4,673,485; 4,681,674; 4,686,028; 4,720,337; 4,743,356; 4,753,721; 4,767,521; 4,769,127; 4,773,986; 4,808,289; and 4,818,371. These prior art processes and equipment have met with varying degrees of success.

BRIEF DESCRIPTION OF THE INVENTION

In these and other refining systems, the low sulfur resid gives many problems because although it may be further refined in a catalytic reactor, many of the components accompanying the low sulfur resid may or may not be cracked. Thus, it is highly desireable to separate these troublesome components from the low sulfur resid as far upstream as possible so that it may be further refined downstream without fouling. In some instances, the invention raises the useful yield from a feedstream from about 70% to nearly 100 vol. %.

Accordingly, an object of the invention is to improve the yield of a resid hydrotreating unit by separating low sulfur resid from components which are most effectively processed in different processes downstream. Here, an object is to provide a separation process which can be added to the front end of virtually any suitable resid hydrotreating unit which may process a feedstream containing low sulfur resid. In particular, one object is to provide such an upstream separation system for use in a resid hydrotreating unit which processes a heavy bottom feedstream in order to prevent or reduce downstream fouling.

Another object of the invention is to utilize the heavy fraction to make high value liquid fuels.

Still another object of the invention is to provide an improved means for, and method of, using low sulfur resids in a hydrotreating processes.

In keeping with one aspect of this invention, at the front end of a resid hydrotreating unit ("RHU"), a number of separator stages are coupled in cascade to receive an incoming feedstream of low sulfur resid, along with a solvent. The mixture taken from the top of the first separator stage can be fed to the second stage separator via a heat exchanger. The mixture taken from the bottom of the first stage separator includes resins and asphaltenes which are fed to a hydrotreater and then, in turn, to a fractionator. The bottom output of this fractionator can be fed back to the incoming resid feedstream of the first stage separator for recycled separation. Th material taken from the top of the second stage separator is fed back through the heat exchanger where it helps heat the mixture fed from the top of the first into the second stage separator. This feedback recovers the solvent for reuse in the first stage. The material taken from the bottom of the second stage separator is fed to a FCCU or processed elsewhere.

BRIEF DESCRIPTION OF THE DRAWINGS

A preferred embodiment of the invention is shown in the attached drawings, in which.

DETAILED DESCRIPTION OF THE INVENTION

Figure 1:
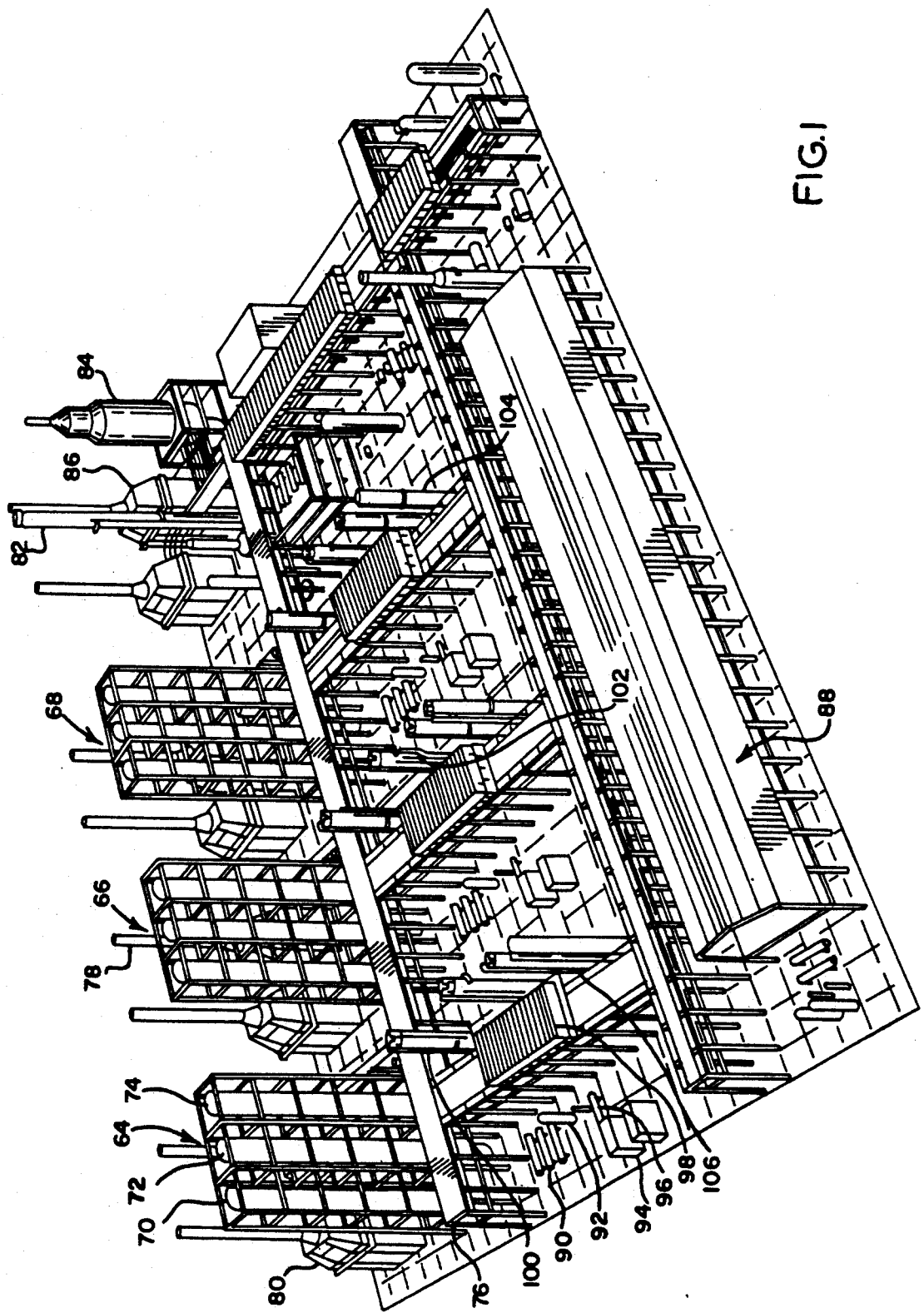
FIG. 1 is a pictorial showing of an exemplary resid hydrotreating unit in which the invention may be used to increase the yield of lighter components.

By way of example, FIG. 1 shows a resid hydrotreating unit ("RHU") portion of a refinery of the Amoco Oil Company, which is located in Texas City, Tex. The inventive separator may be added to provide a feed stream to a front end of this or almost any resid hydrotreating unit.

The resid hydrotreating units and associated refining equipment of FIG. 1 comprise three identical parallel trains of cascaded ebullated bed reactors 70, 72 and 74, as well as hydrogen heaters 78, influent oil heaters 80, an atmospheric tower 82, a vacuum tower 84, a vacuum tower oil heater 86, a hydrogen compression area 88, oil preheater exchangers 90, separators 92, recycled gas compressors 94, flash drums 96, separators 98, raw oil surge drums 100, sponge oil flash drums 102, amine absorbers and recycle gas suction drums 104, and sponge oil absorbers and separators 106.

As shown in FIG. 1, each train of reactors includes resid hydrotreating ebullated bed units 70, 72, and 74. Hydrogen is injected into these ebullated bed reactor through feed line 76. A resid is fed to the reactor where it is hydroprocessed (hydrotreated) in the presence of ebullated (expanded) fresh and/or equilibrium hydrotreating catalyst and hydrogen to produce an upgraded effluent product stream with reactor tail gases (effluent off gases) leaving used spent catalyst. Hydroprocessing in the RHU includes demetallization, desulfurization, denitrogenation, resid conversion, oxygen removal (deoxygenation), hydrotreating, removal of Ramscarbon, and the saturation of olefinic and aromatic hydrocarbons.

The oil feed to the ebullated bed reactor typically comprises resid oil (resid) and heavy gas oil and decanted oil. The feed gas comprises upgraded recycle gases and fresh makeup gases. Demetallatization primarily occurs in the first ebullated bed reactor (such as 70) in each train of reactors. Desulfurization occurs throughout all of the ebullated bed reactors in each train. The effluent product stream typically comprises light hydrocarbon gases, hydrotreated naphtha, distillates, light and heavy gas oil, and unconverted hydrotreated resid. The hydrotreating catalyst typically comprises a metal hydrogenating component dispersed on a porous refractory, inorganic oxide support.

Figure 2:
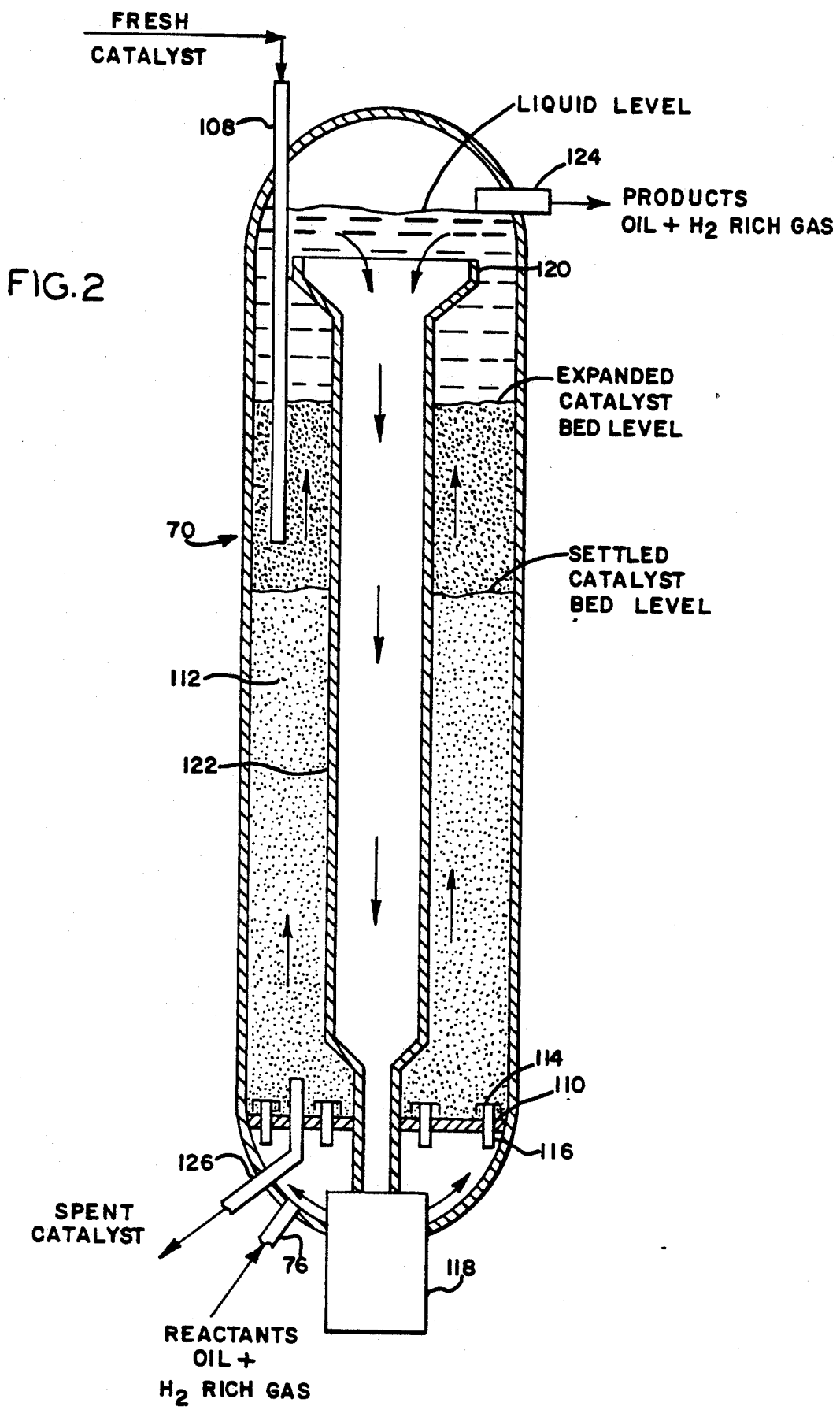
FIG. 2 is a cross-sectional view of an ebullated bed reactor.

FIG. 2 shows an ebullated bed reactor, such as 70 in FIG. 1. Fresh hydrotreating catalyst is fed downwardly into the top of the first ebullated bed reactor 70 through the fresh catalyst feed line 108. Hydrogen-rich gases and feed comprising resid, resins, flash drum recycle, and decanted oil, enter the bottom of the first ebullated bed reactor 70 through feed line 76 and flows upwardly through a distributor plate 110 into the fresh catalyst bed 112. The distributor plate contains numerous bubble caps 114 and risers 116 which help distribute the oil and the gas across the reactor. An ebullated pump 118 circulates oil from a recycle pan 120 through a downcomer 122 and the distributor plate 110. The rate is sufficient to lift and expand the catalyst bed from its initial settled level to its steady state expanded level. The effluent product stream of partially hydrotreated oil and hydrogen-rich gases are withdrawn from the top of the reactor through effluent product line 124. The used spent catalyst is withdrawn from the bottom of the reactor through spent catalyst discharge line 126. The spent catalyst typically contains deposits of metals, such as nickel and vanadium, which have been removed from the influent feed oil (resid) during hydrotreating.

Catalyst particles are suspended in a three-phase mixture of catalyst, oil, and hydrogen-rich feed gas in the reaction zone of the reactor. Hydrogen-rich feed gas typically continually bubbles through the oil. The random ebullating motion of the catalyst particles results in a turbulent mixture of the phases which promotes good contact mixing and minimizes temperature gradients.

The cascading of the ebullated bed reactors in a series of three per reactor train, in which the effluent of one reactor serves as the feed to the next reactor, greatly improves the catalytic performance of the backmixed ebullated bed process. Increasing the catalyst replacement rate increases the average catalyst activity.

The inventive front end of anyone of the trains 64, 66, 68, of the ebullated bed reactors includes a two stage separator (FIG. 4) which separates SEU oils from the low sulfur vacuum residue before the resulting feedstream is sent to a process for deasphalting resid, recovering resins and asphaltenes, and removing fines from decanted oil.

Figure 4:
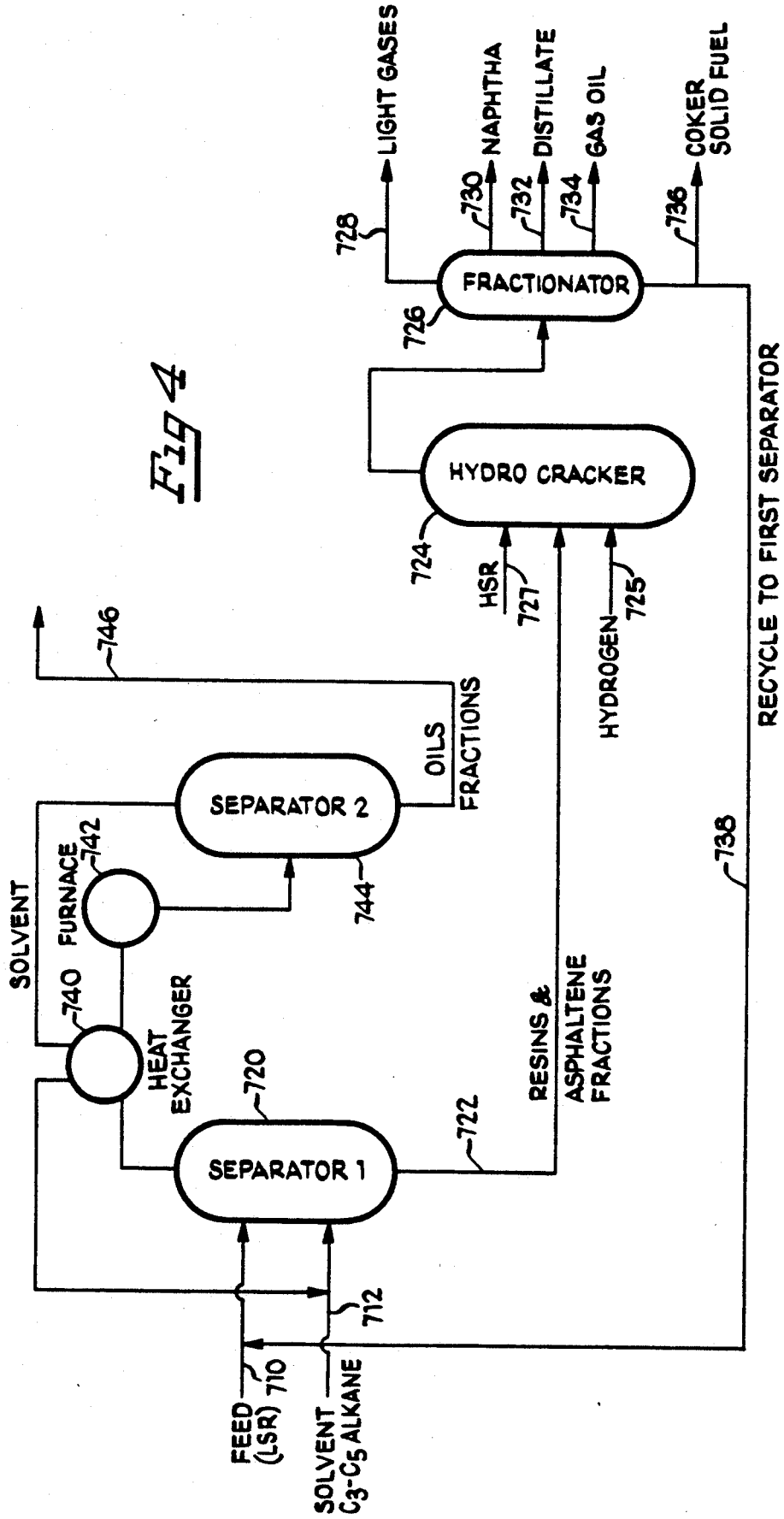
FIG. 4 is a schematic disclosure of a two stage solvent separator which may be placed at a front end of a RHU, such as the RHU of FIG. 1.

In greater detail, FIG. 4 includes two input feedstreams 710 and 712 which are, respectively, a low sulfur resid mix of fresh and recycled oil, and a solvent mix of fresh and recycled solvent at 712. The preferred solvent is $C_3$–$C_5$ alkane. These feedstreams are fed into the first stage separator 720. The materials at the bottom of the separator 720 are the resins and asphaltene fractions which are fed at 722 to hydrotreater 724 where it is mixed with hydrogen (input at 725) and cracked. High sulfur resid ("HSR") is also fed into the hydrotreater 724 at 727.

The output of the hydrotreater 724 is fed to a fractionator 726, where it is separated into light gases 728, naphtha 730, distillates 732, and gas oil 734. The heavier material from the bottom of fractionator 726 is fed to a coker at 736. Alternatively, the material from the bottom is recycled by returning it to the low sulfur input 710 via conduit 738.

The top materials of the first stage separator 720 are fed through a heat exchanger 740 and a furnace 742 to a second stage separator 744. The top material of second stage separator 744 is fed back through the heat exchanger 740 to the solvent input feedstream at 712. Thus, some of the heat in separator 744 is recovered at 740 when this hot solvent transfers its heat to the input stream to separator 744.

The bottom oil fraction material of separator 744 becomes the input feedstream for any of many different refining processes, including catalytic cracking, catalytic feed hydrotreating, and hydrotreating processes. This material is forwarded via conduit 746.

In operation, the inventive process for refining low sulfur resid (FIG. 4) begins in the first separator stage 720 where the low sulfur resid feed is contacted with a solvent of substantially $C_3$-$C_5$ alkanes or mixtures thereof. Normal butane is the preferred solvent. The solvent forms two phases, a first phase containing primarily solvent and oils, and the second phase containing resids and asphaltenes. The second phase is stripped of any remaining residual solvent and then is hydrotreated at 724.

The conditions within the first stage separator 720 include temperatures from about 100° F. below the critical point to the critical point of the solvent, with the preferred range being from about 40° F. below up to the critical point. The pressure in first stage 720 is the same as the pressure in the second stage separator 744, minus any pressure drops between.

The oil and solvent fraction flowing toward the second stage separator 744 is heated by a heat exchange at 740 wherein hot solvent returning from the second stage separator 744 adds heat to the oil/solvent fraction from first stage separator 720. The oil/solvent fraction is further heated in a furnace 742 before it is introduced into the second stage separator 744. There the temperature may be up to 100° F. higher, and preferably up to 50° F. higher, than the critical temperature of the solvent. The pressure in the second stage separator 744 is above the critical pressure of the solvent. As the temperature is increased, the oils fraction rapidly loses its solubility in the solvent so that the oils-fraction and solvent separate in the second stage separator. The outflowing solvent is preferably cooled at 740 by a heat exchange with the incoming stream, thereby saving the heat. Then, the solvent is recycled. While it is once again in the first stage, it mixes with fresh incoming solvent and low sulfur resid.

After the oils-fraction (which is separated by the second separator stage 744) is stripped of its residual solvent, it is forwarded over line 746 to be catalytically cracked. Prior to such catalytic cracking, residual metals and heteroatoms may be removed, and olefins and aromatics may be saturated, in a catalytic feed hydrotreater ("CFHU"). Generally, a fixed bed CFHU is used although other configurations are also possible The preferred conditions are 650°-750° F., 0.5-2 LHSV 500-1500 psi hydrogen pressure, and 500-3000 SCFB gas rate. Conventional NiMo catalysts are preferred, but CoMo catalysts and NiW and other hydrogenation catalysts may be used.

The bottom, heavy fraction separated in the first stage separator 720 and exiting at 722, includes resins and asphaltenes, and is to be upgraded by hydrotreating. The distinguishing feature of a hydrotreating process is that substantial amounts (at least 25%, and preferably 50% or more) of the resid are converted into lighter products.

Any type of reactor may be used, but an ebullated bed reactor is preferred where the catalyst pellets are suspended by the motion of liquid within the bed. Other, but somewhat less preferred reactors are fixed bed, or a slurry bed where a finely divided catalyst is essentially intermixed with the liquid. Pressures are 1000-5000 psi hydrogen with 2000-3000 being preferred. Temperatures are 750°-850° F., with 780°-820° F. preferred. HSR is preferably used as the feed to the ebullated bed reactor.

The output product from the hydrotreating step is then separated into fractions at 726, yielding a 1000+° F. product which may be recycled at 738 to the first separator, stage 720, coked, or blended into solid or liquid fuels. In the preferred embodiment, a significant fraction (at least 50%) is recycled to the first separator stage 720.

EXAMPLE 1

Table 1 shows the data which is yielded by inspections of typical low and high sulfur resids. Besides being relatively low in sulfur content, the low sulfur resid is also lighter, and richer in hydrogen, and it contains less metals and Ramscarbon. When fractionated into oils, resins and asphaltenes, by using the solvent n-butane in the separation process of the present invention, the qualities of the corresponding fractions are remarkably similar except for the abundance of sulfur in the fractions from the high sulfur resid. Thus, low sulfur resid is different from high sulfur resid. This is not because the composition of each fraction varies, but rather, because the amounts of oils, resins, and asphaltenes are different in low and high sulfur resids.

TABLE 1

|  | Whole Resid | Oils | Resins | Asphaltenes |
|---|---|---|---|---|
| Qualities of a Low Sulfur Resid | | | | |
| °API @ 60° F. | 11.6 | 18.6 | 9.5 | — |
| WT % | | | | |
| S | 1.08 | 0.82 | 1.2 | 1.74 |
| N | 0.49 | 0.30 | 0.58 | 0.96 |
| Atomic H/C Ratio | 1.53 | 1.66 | 1.48 | 1.17 |
| Ramscarbon, WT % | 14.7 | 4.3 | 16.5 | 46.9 |
| ppm | | | | |
| Vanadium | 61 | 4 | 38 | 252 |
| Nickel | 39 | 11 | 32 | 126 |
| Iron | 38 | <2 | <2 | 202 |
| WT % Yield | | 61.2 | 20.2 | 18.6 |
| Qualities of a High Sulfur Resid | | | | |
| °API @ 60° F. | 53 | 15.6 | 7.9 | −3.2 |
| WT % | | | | |
| S | 4.1 | 3.1 | 4.1 | 4.9 |
| N | 0.54 | 0.27 | 0.45 | 0.94 |
| Atomic H/C Ratio | 1.41 | 1.63 | 1.44 | 1.18 |
| Ramscarbon, WT % | 21.8 | 4.2 | 14.3 | 39.6 |
| ppm | | | | |
| Vanadium | 187 | 8 | 59 | 393 |
| Nickel | 55 | 10 | 24 | 107 |
| Iron | 20 | <2 | 3 | 52 |
| WT % Yield | | 39.7 | 14.8 | 45.5 |

EXAMPLE 2

Figure 6:
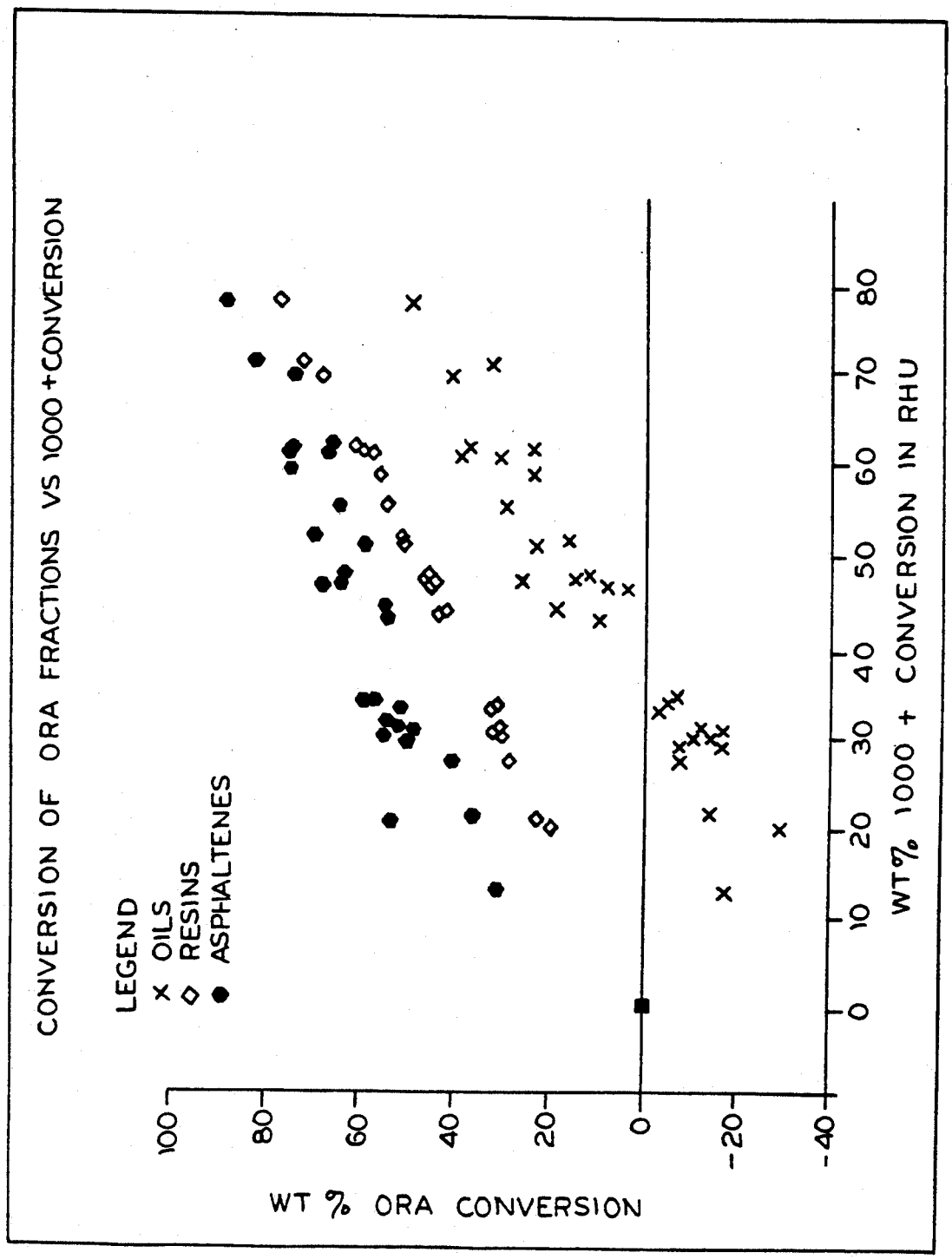
FIG. 6 is a graph which indicates the conversion of oil, resins, and asphaltene ("ORA") fractions of the resid.

FIG. 6 shows the relative conversion of the oil, resid and asphaltenes ("ORA") fractions of a typical resid, as a function of the total conversion obtained in the hydrotreating unit. Secondary variables (such as hydrogen pressure) affect the conversion of each of these fractions. Asphaltenes are the most reactive. Resins have an average reactivity. Oils are the least reactive of the fractions.

The conversion of oils is initially negative because some of the resins and asphaltenes are converted into oils in the initial stages of hydrotreatment. It is least desirable to subject the oils fraction to hydrotreating because it has a poor reactivity. Further, it is evident from Example 1 that the oils fraction is the most desireable fraction for catalytic cracking because it has a relatively low metals content which causes little fouling of the FCCU catalyst. Also, it has a low nitrogen and Ramscarbon content which gives only a modest coke formation. The high hydrogen content leads to a high conversion to 430° F., gasoline boiling range products.

EXAMPLE 3

Table 2 shows the relative reactivities under conventional hydrotreating conditions of high and low sulfur resids, which are similar to the reactives described in Example 1. Except for demetallization reactions that remove Ni and V, the high sulfur resid is more reactive for desulfurization, denitrogenation, Ramscarbon removal, and 1000° F. conversion to distillable products. In addition, the high sulfur resid contains significantly higher amounts of S, V, Ni, and Ramscarbon. The total amount of these elements which are removed per unit of feed treated is higher for the high sulfur resid as compared to the removal for the low sulfur resid.

TABLE 2

Reactivities of Low and High Sulfur Resids in Hydrotreatment

| Conditions: | 800° F. |
| | 0.6 LHSV |
| | 2000 Psig Hydrogen Pressure |
| | 5000 SCFB gas rate |

% Conversions based on WT % Removal of Component From Feed Components

|  | S | N | V | Ni | RAMS | 1000+ |
|---|---|---|---|---|---|---|
| LSR | 47 | 8 | 82 | 73 | 38 | 38 |
| HSR | 55 | 23 | 74 | 57 | 45 | 47 |

EXAMPLE 4

Table 3 compares the yields obtained by catalytically cracking a whole low sulfur resid and the oils fraction. Yields comparison are based on a constant conversion of 65%. It can be seen that the oils fraction yields a desireable product slate; more desirable in that it is comprised of less coke, less light gases, and more naphtha.

TABLE 3

FCCU Yields @ 65% Conversion

|  | Whole Low Low Sulfur Resid | LSR Oils Oil Fraction |
|---|---|---|
| Light Gases (H$_2$, H$_2$S, C$_1$'s, C$_2$'s) | 4.9 | 4.1 |
| C$_3$ and C$_4$ Gases | 13.7 | 11.1 |
| Naphtha (C$_5$-430° F.) | 34.7 | 40.6 |
| Cycle Oils | 35.0 | 35.0 |
| Coke | 10.5 | 7.9 |

Figure 5:
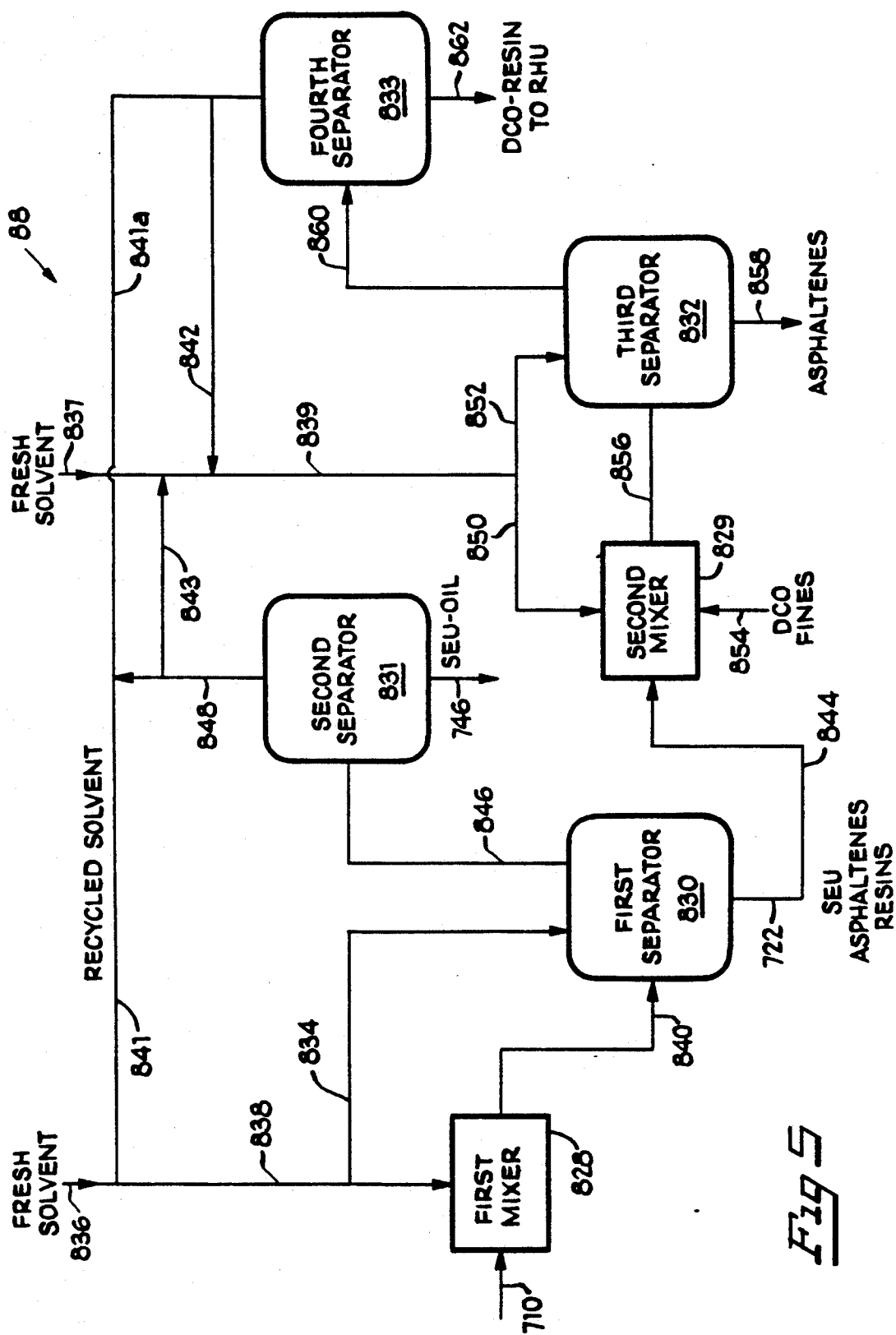
FIG. 5 is a schematic diagram of a second embodiment having four solvent separator stages (FIG. 4 is taken from Ser. No. 07/616,219 filed Nov. 20, 1990 now U.S. Pat. No. 5,129,025)

FIG. 5 is an alternative embodiment which might use the invention as an upstream input stage for a resid hydrotreating unit. More particularly, a four stage solvent extraction deasphalting unit is used preferably to provide fine-free decanted oil ("DCO") and solvent extraction unit ("SEU") oil free of DCO. This system is also described in co-pending application Ser. No. 07/616,219, filed Nov. 20, 1990.

The systems of FIG. 5 comprises two mixers 828, 829 and four separator vessel or zones 830, 831, 832, 833 which are operated within 100° F. below or above the critical condition of the solvent. The low sulfur resid, or a mixture of low sulfur and hydrotreated resid, appearing at 710 is conveyed to mixing zone 828 (FIG. 5). Fresh makeup solvent is pumped through fresh solvent lines 836, 837, combined within fresh and recycled solvent lines 838, 839, and pumped into the mixers 828, 829. Recycled solvent in recycle solvent lines 841, 841a, and 842 is also pumped through the combined solvent lines 838, 839, respectively, and into the mixers 828 and 829. In the best instance, the solvent may include large amounts of pentane and/or butane. The total solvent (fresh and recycled solvent) to feed ratio is from about 3:1 to about 20:1 and preferably from about 8:1 to about 12:1. In some circumstances, it may be desirable to use or include other solvents. The preferred solvent for first and second separators is butane or isomers thereof. The preferred solvent for the third and fourth separators is pentane or isomers thereof.

When the same solvent is used in fresh solvent lines 836 and 837, solvent may also be recycled from the second separator via recycle solvent line 843 and combined solvent 839 to the second mixer 829 and/or to the third separator 832.

In the preferred embodiment, only a small amount of the solvent is mixed in mixers 828 and 829. The largest percentage of the solvent is injected (via lines 834 and 852 respectively) in a countercurrent to the feed at the bottom portions of the separators 830 and 832 in order to obtain a countercurrent extraction of the asphaltenes and resin in the first separator vessel 830 and asphaltenes in the third separator 832.

The low sulfur feedstream which flows in at 710 is mixed in the mixer 828 and then conveyed through a resid-solvent line 840 to the first separator vessel or zone 830. In some circumstances, it may be desirable to send the incoming feedstream directly into the first separator 830 (in the above ratios) without previously sending it through the first mixing chamber 828.

In the first separator 830, the SEU asphaltenes and resins containing a substantial amount of organometallic components are solvent-extracted and separated from the mixture of solvent and hydrotreated resid. The heavier solvent-extracted asphaltenes and resins are withdrawn from the first separator 830 through SEU asphaltene-resin line 844 and conveyed or otherwise transported to a second mixer 829. A mixture of the lighter solvent and SEU oil is withdrawn from the first separator 830 and conveyed or otherwise transported via a heater or heat exchanger (not shown) through SEU oil-solvent line 846, to the second separator 831. The first separator 830 is operated at an elevated temperature and pressure to separate asphaltenes and resins from the solvent and oils.

In the second separator (oil separator) 831, substantially deasphalted, demetallized, resin-free (SEU) oil is separated from the solvent. The second separator 831 is operated at an elevated temperature and pressure to separate the SEU-oil and solvent. The temperature in the second separator 831 is higher than the temperature in the second separator 830 and above the critical temperature of the solvent. Preferably, the pressure in the second separator 831 is at least equal to the critical pressure of the solvent. The preferable pressure in the second separator 831 is at least equal to the critical pressure of the solvent. Preferably, the temperature in the second separator 831 is maintained at least about 50° F. above the critical temperature of the solvent.

The second separator 831 acts as a flash drum in which the solvent is separated from the SEU oil. When operating at supercritical conditions, no heat or vaporization is required to separate the solvent from the SEU oil, thereby enhancing the energy efficiency of the deasphalter.

The solvent is withdrawn from the second separator 831 via solvent line 848 and is recycled through lines 841, 838 and 834 to the first mixer 828 and first separator 830. If desired, the solvent from the second separator 831 may be recycled via lines 843, 839, 850 and 852 to the second mixer 829 and/or third separator 832.

The solvent-extracted oil (SEU oil) is discharged from the second separator 831 through the SEU oil line 850 and fed to the catalytic cracker as part of its feedstock.

Resin and asphaltenes are conveyed from the first separator 830 via resin-asphaltene line 844 to a second mixer 829. Decanted oil containing fines is conveyed to the second mixer via DCO line 854. Fresh solvent and/or recycled solvent from the second and fourth separators 831, 833 may be added in the second mixer 829. The recycled solvent from the fourth separator 833 is shown as being conveyed by line 842 to the combined solvent line 839. Fresh and/or second separator solvent is conveyed via line 843 to the combined solvent line 839.

The ratio of decanted oil to the resin-asphaltene mixture is from about 1:5 to about 2:1 and preferably from about 3:10 to about 1:1.

The ratio of total solvent to the resin-asphaltene mixture is from about 3:1 to about 20:1 and preferably from about 8:1 to about 12:1.

The solvent, asphaltene-resin mixture and DCO mixture are conveyed from the second mixer 829 through a heater or heat exchanger (not shown) via line 856 to the third separator 832.

In some cases, the use of different solvents will produce higher purity oils while maintaining low asphalt yield. To achieve this end, two different fresh solvents may be fed through lines 836 and 837. In such a case, lines 841a and 843 would not be used.

The third separator 832 can be operated within a range of temperatures from about 150° F., to a high level that is above the critical temperature of the solvent. When being operated at a temperature below the critical temperature of the solvent, the pressure must be at least equal the solvent's vapor pressure. When it is, instead, operated at a temperature which is equal to or above the critical temperature of the solvent, the pressure within the separator 832 should be at least equal the critical pressure of the solvent.

Preferably, the operating temperature of the third separator 832 ranges from about 20° F. below the critical temperature of the solvent to about the critical temperature of the solvent.

The solvent-extracted asphaltenes containing the DCO catalyst fines are withdrawn from the third separator 832 via SEU asphaltene line 858 and conveyed to a solid fuel area and/or coker.

The majority of solvent, fine-lean DCO, plus the remaining resins of the hydrotreated resid are withdrawn from the third separator 832 and conveyed first through DCO-solvent-resins line 860, and then through a heater or heat exchanger to the fourth separator vessel or zone 833. This fourth separator 833 is maintained (1) at a temperature level higher than the temperature level within the third separator 832, and (2) at the same pressure as the third vessel 832, minus any pressure drops between vessels 832 and 833. Through this process, the influent residue is separated into 1) a fluid-like light phase comprising a solvent, and 2) a fluid-like second heavy phase including fine-lean DCO, resins, and a minority of the solvent.

The light phase which separates within the fourth separator 833 is collected in an upper portion of the fourth separator 833. In the fourth or resin separator 833, deasphalted resins and fine-lean DCO are 1) solvent-extracted deasphalted resins, and 2) a fine-lean DCO mixture which are discharged from the fourth separator 833 through a DCO-resin line 862. If desired, the output 862 may be fed to an ebullated bed reactor (such as 70, FIG. 1) of the resid hydrotreating unit ("RHU") as part of its feedstock.

In the preferred embodiment, the fourth separator 833 is operated at a temperature which is above that in the third separator 832. The pressure level of fourth separator 833 is maintained equal to the vapor pressure of the third separator 832 minus any pressure drop between the vessels 832 and 833. Because these pressure levels are the same, the flow between does not require the use of a pump. However, there is always the option to use a pump since the vapor-liquid equilibrium enables the third vessel 832 to be operated at a pressure below that of fourth vessel 833.

Preferably, the operating temperature of the fourth separator 833 is from about 5° F. to about 100° F. above the temperature in the third separator 832, and most preferably at a temperature of from about 50° F. to about 100° F. above the critical temperature of the solvent. The operating pressure of the fourth separator 733 is substantially the same pressure level that is maintained in third separation zone 832.

The first, second and third heavy phases of asphaltenes, resins, and SEU oil, respectively, can be passed into individual stripping sections (not shown), such as steam strippers, to strip any solvent that may be contained in the phases.

In operation, a resid refining process (FIG. 3) begins when unrefined, raw, whole crude oil (petroleum) is withdrawn from an above ground storage tank 10 at about 75° F. to about 80° F. by a pump 12 and pumped through feed line 14 into one or more desalters 16 to remove particulates, such as sand, salt, and metals, from the oil. The desalted oil is fed through furnace inlet line 18 into a pipestill furnace 20 where it is heated to a temperature, such as to 750° F. at a pressure ranging from 125 to 200 psi. The heated oil is removed from the furnace through exit line 22 by a pump 24 and pumped through a feed line 25 to a primary distillation tower 26.

The heated oil enters the flash zone of the primary atmospheric distillation tower, pipestill, or crude oil unit 26 before proceeding to its upper rectifier section or the lower stripper section. The primary tower is preferably operated at a pressure less than 60 psi. In the primary tower, the heated oil is separated into fractions of wet gas, light naphtha, intermediate naphtha, heavy naphtha, kerosene, virgin gas oil, and primary reduced crude. A portion of the wet gas, naphtha, and kerosene is preferably refluxed (recycled) back to the primary tower to enhance fractionation efficiency.

Figure 7:
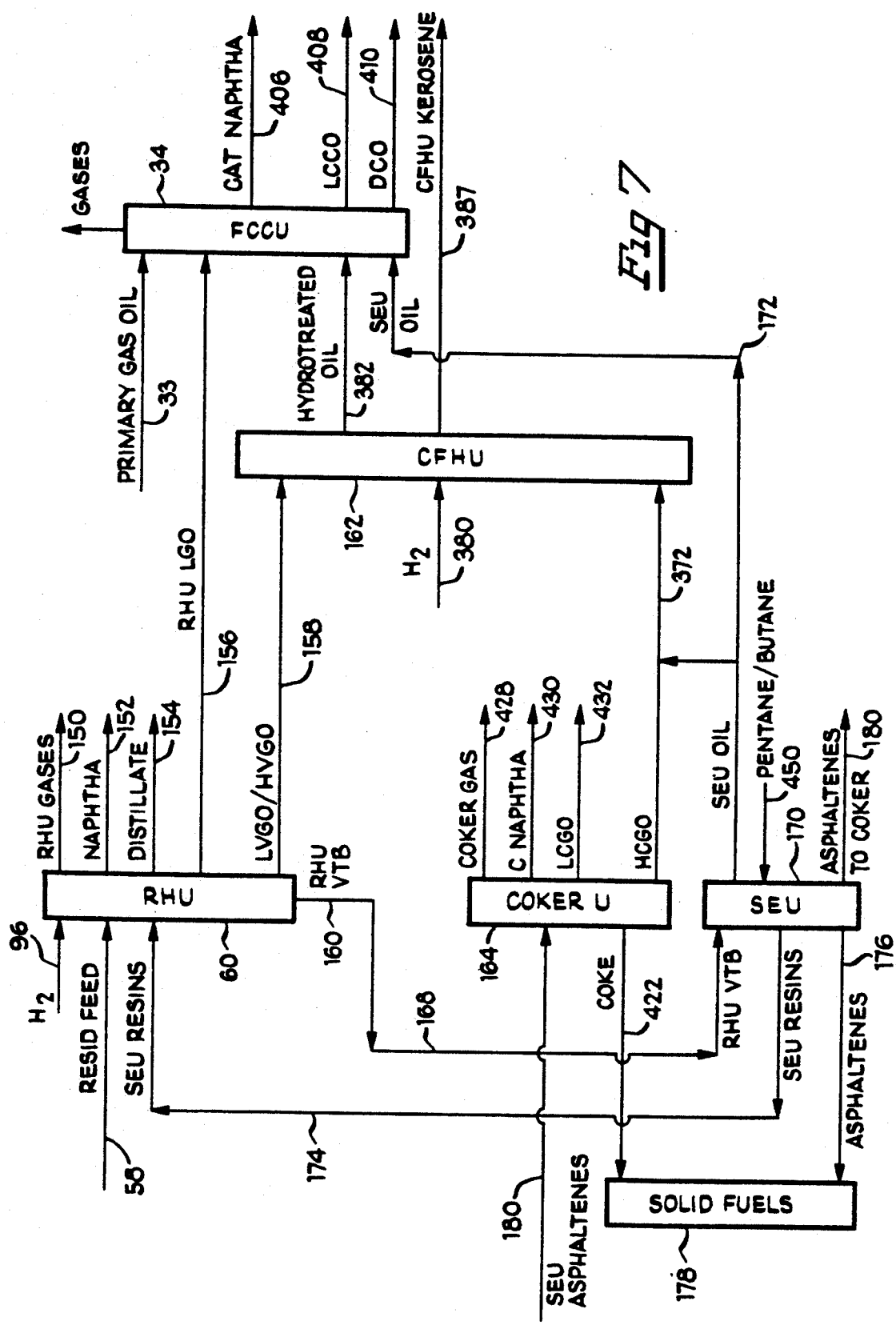
FIG. 7 is a schematic flow diagram for partially refining crude oil.

Wet gas is withdrawn from the primary tower 26 through overhead wet gas line 28. Light naphtha is removed from the primary tower through light naphtha line 29. Intermediate naphtha is removed from the primary tower through intermediate naphtha line 30. Heavy naphtha is withdrawn from the primary tower 26 through heavy naphtha line 31. Kerosene and oil for producing jet fuel and furnace oil are removed from the primary tower through kerosene line 32. Primary virgin, atmospheric gas oil is removed from the primary tower through primary gas oil line 33 and pumped to the fluid catalytic cracking unit (FCCU) 34 (FIG. 7).

Primary reduced crude is discharged from the bottom of the primary tower 26 (FIG. 3) through the primary reduced crude line 35. The primary reduced crude in line 35 is pumped by pump 36 into a furnace 38 where it is heated, such as to a temperature from about 520° F. to about 750° F. The heated primary reduced crude is conveyed through a furnace discharge line 40 into the flash zone of a pipestill vacuum tower 42.

The pipestill vacuum tower 42 is preferably operated at a pressure ranging from 35 to 50 mm of mercury. Steam is injected into the bottom portion of the vacuum tower through steam line 44. In the vacuum tower, wet gas is withdrawn from the top of the tower through overhead wet gas line 46. Heavy and/or light vacuum gas oil are removed from the middle portion of the vacuum tower through heavy gas oil line 48. Vacuum-reduced crude is removed from the bottom of the vacuum tower through vacuum-reduced crude line 50. The vacuum-reduced crude typically has an initial boiling point near about 1000° F.

The vacuum-reduced crude, also referred to as resid, resid oil, and virgin unhydrotreated resid, is pumped through vacuum-reduced crude lines 50 and 52 by a pump 54 into a feed drum or surge drum 56. Resid oil is pumped from the surge drum 56 through resid feed line 58 (FIG. 7) into a resid hydrotreating unit complex 60 (RHU) comprising three resid hydrotreating units and associated refining equipment as shown in FIG. 8.

Figure 3:
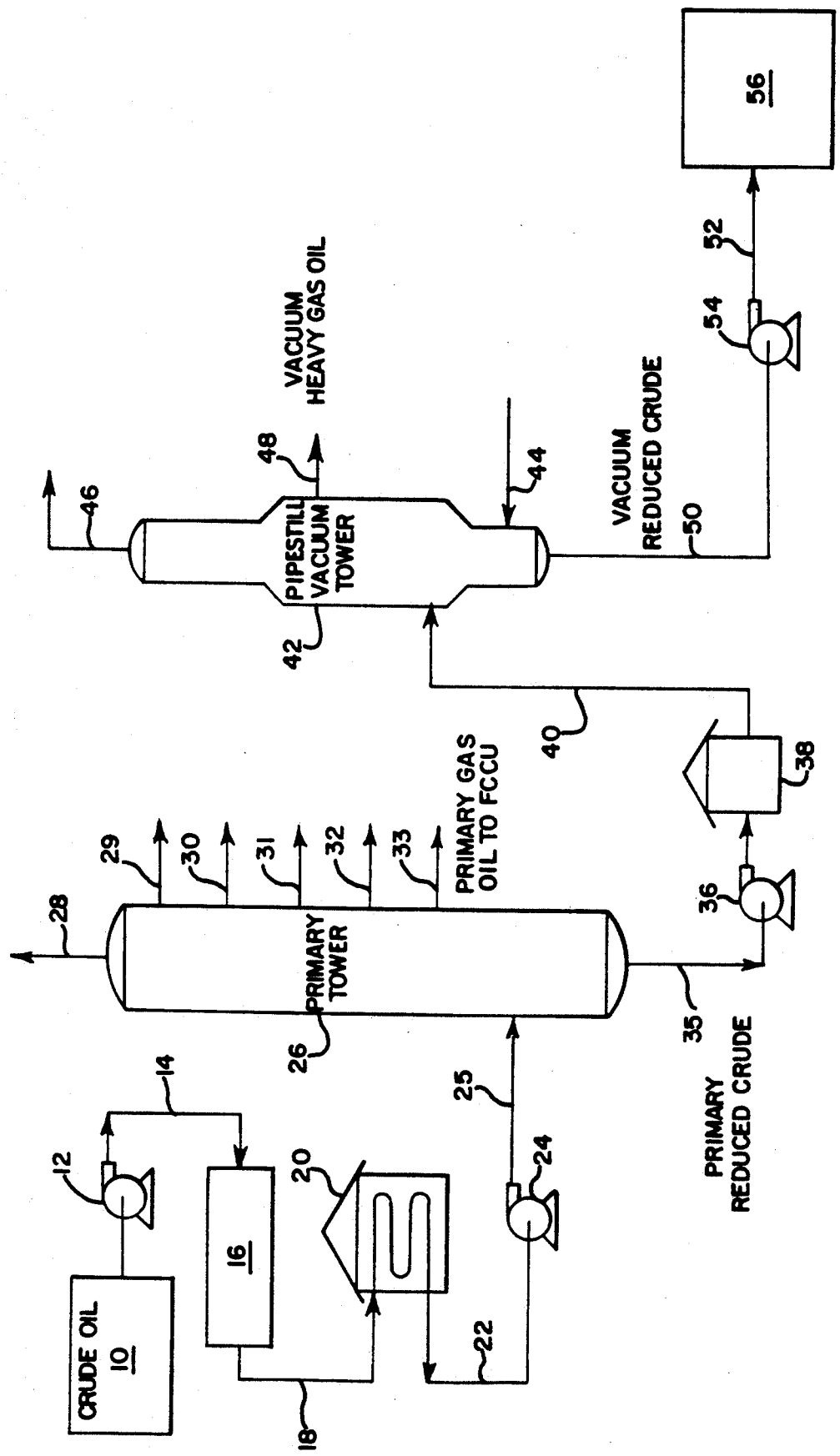
FIG. 3 is a schematic flow diagram for partially refining crude oil.
Figure 8:
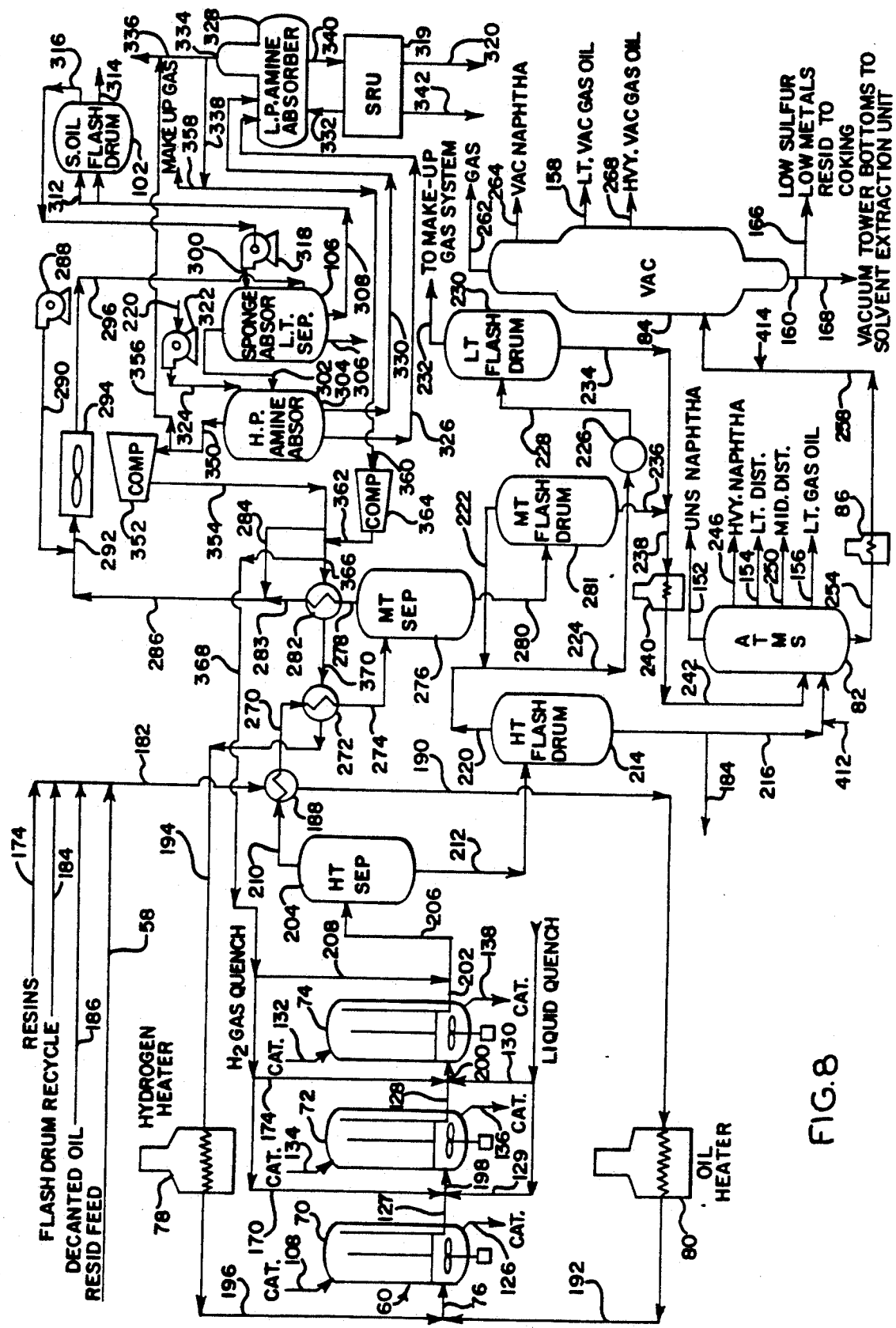
FIG. 8 is a schematic flow diagram of a resid hydrotreating unit.

The inventive front end processor of FIG. 4 or FIG. 5 fits between the output at 56 in FIG. 3 and the input at 58 (FIG. 7) or 182 in FIG. 8.

As shown in FIG. 6, the products produced form the resid hydrotreating units 60 in the ebullated bed reactors include: light hydrocarbon gases (RHU gases) in the gas line 150; naphtha comprising light naphtha, intermediate naphtha, heavy naphtha and vacuum naphtha in one or more naphtha lines 152; distillate comprising light distillate and mid-distillate in one or more distillate lines 154; light gas oil in gas oil line 156; light vacuum gas oil and heavy vacuum gas oil in one or more vacuum gas oil lines 158; and hydrotreated vacuum resid comprising vacuum tower bottoms in a vacuum resid line 160. Light and intermediate naphthas can be sent to a vapor recovery unit for use as gasoline blending stocks and reformer feed. Heavy naphtha can be sent to the reformer to produce gasoline. The mid-distillate oil is useful for producing diesel fuel and furnace oil, as well as for conveying and/or cooling the spent catalyst. Resid hydrotreated (RHU) light gas oil is useful as feedstock for the catalytic cracking unit 34. Light and heavy vacuum gas oils can be upgraded in a catalytic feed hydrotreating unit 162 (CFHU). Some of the vacuum resid comprising resid hydrotreating unit vacuum tower bottoms (RHU VTB) can be sent to the coker unit 164 to produce coke. A substantial portion of the vacuum resid (RHU VTB) can be fed through a feeder line or inlet line 168 to a deasphalter or deasphalting unit 170 where the vacuum resid is separated into deasphalted oil, deasphalted resins, and asphaltenes.

In the preferred embodiment, the deasphalter 170 (FIG. 7) comprises a solvent extraction unit (SEU) operated with supercritical solvent recovery. Deasphalted solvent-extracted oil (SEU oil) in SEU oil line 172 is useful as feedstock to the catalytic cracking unit 34 to increase the yield of gasoline and other hydrocarbon liquids. Deasphalted solvent-extracted resins (SEU resins) in SEU resin line 174 are useful as part of the feed to the resid hydrotreating unit (RHU) 60 to increase the yield of more valuable lower-boiling liquid hydrocarbons. A portion of the asphaltenes can be conveyed or passed through an asphaltene line or chute 176 or otherwise transported to a solid fuels mixing and storage facility 178, such as tank, bin or furnace, for use as solid fuel. Another portion of the solvent-extracted asphaltenes (SEU asphaltenes) can be conveyed or passed through a SEU asphaltene line or chute 180 to the coker 164.

As shown in FIG. 8, the feed stream input 182 to the ebullated bed reactors may come from many sources including the front end processors of FIGS. 4 and 5. In addition, a relatively high sulfur resid oil feed, which can contain heavy gas oil, is conveyed by a resid feed line 58 to a combined feed line 182. Solvent-extracted resins in resin line 174 are also fed to combined feed line. Flash drum recycle oil in flash drum recycle line 184 and decanted oil (DCO) in decanted oil line 186 can also be fed and mixed in combined feed line 182. The feed in combined feed line 182 comprising LSR, resid, SEU resins, decanted oil, and flash drum recycle oil is conveyed to a heat exchanger 188 where the feed is preheated. The feed is conveyed through a preheated feed line 190 to an oil heater 80 where it is heated to a temperature ranging from about 650° F. to 750° F. The heated feed (feedstock) is passed through a heated influent feed line 192 to an oil gas feed line 76.

Hydrogen-containing feed gas in the feed gas line 194 is fed into a hydrogen heater or feed gas heater 78 where it is heated to a temperature ranging from about 650° F. to about 900° F. The feed gas is a mixture of upgraded, methane-lean tail gases (effluent off gases) and hydrogen-rich, fresh makeup gases comprising at least about 95% by volume hydrogen and preferably at least about 96% by volume hydrogen. The feed gas comprises a substantial amount of hydrogen, a lesser amount of methane, and small amounts of ethane. The heated feed gas is conveyed through the heated feed gas line 196 to the gas oil feed line 76 where it is conveyed along with the heated resid oil to the first ebullated bed reactor 70.

Fresh hydrotreating catalyst is fed into the first ebullated bed reactor 70 through the fresh catalyst line 108. Spent catalyst is withdrawn from the first reactor through the spent catalyst line 126. In the first reactor, the resid oil is hydroprocessed (hydrotreated), ebullated, contacted, and mixed the hydrogen-rich feed gas in the presence of the hydrotreating catalyst at a temperature of about 700° F. to about 850° F., at a pressure of about 2650 psia to about 3050 psia, and at a hydrogen partial pressure of about 1800 psia to about 2300 psia to produce a hydrotreated (hydroprocessed), upgraded, effluent product stream. The product stream is discharged from the first reactor through the first reactor discharge line 127 and conveyed through the second reactor feed line 198 into the second ebullated bed reactor 72. A liquid quench can be injected into the product feed entering the second reactor through a liquid quench line 129. The liquid quench can be sponge oil. A gas quench can be injected into the product feed before it enters the second reactor through a gas quench line 170. The gas quench preferably comprises a mixture of upgraded, methane-lean tail gases (effluent off gases) and fresh makeup gases.

Hydrotreating catalyst, which may be removed from the third reactor, is fed into the second reactor 72 through an influent catalyst line 134. Used spent catalyst is withdrawn from the second reactor through the second spent catalyst line 136. In the second reactor, the effluent resid oil product is hydroprocessed, hydrotreated, ebullated, contacted, and mixed with the hydrogen-rich feed gas and quench gas in the presence of the hydrotreating catalyst at a temperature of about 700° F. to about 850° F., at a pressure from about 2600 psia to about 3000 psia and at a hydrogen partial pressure of about 1700 psia to about 2100 psia to produce an upgraded effluent product stream. The product stream is discharged from the second reactor through a second reactor discharge line 128.

The product feed is then fed into the third ebullated bed reactor 74 through a third reactor feed line 200. A liquid quench can be injected into the third reactor feed through an inlet liquid quench line 130. The liquid quench can be sponge oil. A gas quench can be injected into the third reactor feed through an input gas quench line 174. The gas quench can comprise upgraded, methane-lean tail gases and fresh makeup gases. Fresh hydrotreating catalyst is fed into the third reactor through a fresh catalyst line 132. Used spent catalyst is withdrawn from the third reactor through the third reactor spent catalyst line 138. In the third reactor, the resid feed is hydroprocessed, hydrotreated, ebullated, contacted, and mixed with the hydrogen-rich gas in the presence of the hydrotreating catalyst at a temperature from about 700° F. to about 850° F., at a pressure of about 2550 psia to about 2950 psia and at a hydrogen partial pressure from about 1600 psia to about 2000 psia to produce an upgraded product stream. The product stream is withdrawn from the third reactor through the third reactor discharge line 20 and fed into a high-temperature, high-pressure separator 204 via inlet line 206. A gas quench can be injected into the product stream in the inlet line through a gas quench line 208 before the product stream enters the high-temperature separator. The gas quench can comprise upgraded, methane-lean tail gases and fresh makeup gases.

The upgraded effluent product streams discharged from the reactors comprise hydrotreated resid oil and reactor tail gases (effluent off gases). The tail gases comprise hydrogen, hydrogen sulfide, ammonia, water, methane, and other light hydrocarbon gases, such as ethane, propane, butane, and pentane.

In the high-temperature (HT) separator 204, the hydrotreated product stream is separated into a bottom stream of high-temperature, hydrotreated, heavy oil liquid and an overhead stream of gases and hydrotreated oil vapors. The high-temperature separator 204 is operated at a temperature of about 700° F. to about 850° F. and at a pressure from about 2500 psia to about 2900 psia. The overhead stream of gases and oil vapors is withdrawn from the high-temperature separator through an overhead line 210. The bottom stream of high-temperature heavy oil liquid is discharged from the bottom of the high-temperature separator through a high-temperature separator bottom line 212 and fed to a high-temperature flash drum 214.

In the high-temperature flash drum 214, the influent stream of heavy oil liquid is separated and flashed into a stream of high-temperature vapors and gases and an effluent stream of high-temperature, heavy oil liquid. The flash drum effluent, high-temperature, hydrotreated, heavy resid oil liquid (flash drum effluent) is discharged from the bottom of the flash drum 214 through the high-temperature flash drum bottom line 216. Part or all of the flash drum effluent in line 216 is fed into an atmospheric tower 82. Preferably, part of the flash drum effluent comprises flash drum recycle which is recycled to the first ebullated bed reactor 70 through flash drum recycle line 184 as part of the oil feed. The high-temperature flash gas and vapors are withdrawn from the high-temperature flash drum 214 through a high-temperature flash drum overhead line 220 and are conveyed, blended, and intermixed with medium-temperature overhead flash vapors from the medium-temperature (MT) flash drum overhead line 222 through a combined, common flash line 224. The combined flash gas and vapors are optionally cooled in one or more heat exchangers or coolers 226 before being conveyed through a line 228 to the low temperature (LT) flash drum 230.

In the LT flash drum 230, the influent high-temperature flash gases and vapors are separated into low-pressure gases and light oil liquid. The low-pressure gases are withdrawn from the LT flash drum through an outlet gas line 232 and conveyed downstream to the makeup gas system for use as sweet fuel. The light oil liquid is discharged from the LT flash drum through a light oil line 234 and is conveyed, blended, and intermixed with medium-temperature, light oil liquid from the medium-temperature, flash drum light oil line 236 in a combined, common light oil line 238. The combined medium-temperature, light oil liquid is heated in a furnace 240 and conveyed through a light oil feed line 242 to the atmospheric tower 82.

In the atmospheric tower 82, the hydrotreated, high-temperature, heavy oil liquid from the high-temperature flash drum effluent oil line 216 and the hydrotreated, medium-temperature, light oil liquid from the medium-temperature oil line 242 can be separated into fractions of light and intermediate naphtha, heavy naphtha, light distillate, mid-distillate, light atmospheric gas oil, and atmospheric hydrotreated resid oil. Light and intermediate naphtha can be withdrawn from the atmospheric tower through an unstable naphtha line 152. Heavy naphtha can be withdrawn from the atmospheric tower through a heavy naphtha line 246. Light distillate can be withdrawn from the atmospheric tower through a light distillate line 154. Mid-distillates can be withdrawn from the atmospheric tower through a mid-distillate line 250. Light virgin atmospheric gas oil can be withdrawn from the atmospheric tower through a light atmospheric gas oil line 156. Atmospheric resid oil is discharged from the bottom portion of the atmospheric tower through the atmospheric resid line 254 and heated in an atmospheric resid oil heater 86 before being conveyed through a vacuum tower feed line 258 to the vacuum tower 84.

In vacuum tower 84, the atmospheric influent, hydrotreated resid oil can be separated into gases, vacuum naphtha, light vacuum gas oil, heavy vacuum gas oil, and hydrotreated, vacuum resid oil or vacuum resid. The gases are withdrawn from the vacuum tower through an overhead vacuum gas line 262. Vacuum naphtha can be withdrawn from the vacuum tower through a vacuum naphtha line 264. Light vacuum gas oil (LVGO) can be withdrawn from the vacuum tower through a light vacuum gas oil line 158. Heavy vacuum gas oil (HVGO) can be withdrawn from the vacuum tower through a heavy vacuum gas oil line 268. Vacuum resid oil (vacuum resid) is withdrawn from the bottom of the vacuum tower 84 through a RHU vacuum tower bottoms line 160. Some of the vacuum resid is fed to a coker via a vacuum resid discharge line 166. The rest of the vacuum resid is conveyed to the solvent extract unit via a vacuum resid line 168.

Referring again to the high-temperature separator 204 (FIG. 8), high-temperature gases and oil vapors are withdrawn from the high-temperature separator 204 through an overhead vapor line 210 and cooled in a resid feed heat exchanger 188 which concurrently preheats the oil and resin feed in combined line 182 before the oil and resin feed enters the oil heater 80. The cooled vapors and gases exit the heat exchanger 188 and are passed through an intermediate line 270 and cooled in a high-temperature gas quench heat exchanger 272 which concurrently preheats the feed gas before the feed gas passes through the hydrogen heater inlet line 194 into the hydrogen heater 78. The cooled gases and vapors exit the heat exchanger 272 and are passed through a medium-temperature inlet line 274 to a medium-temperature, high-pressure separator 276.

In the medium-temperature (MT) separator 276, the influent gases and oil vapors are separated at a temperature of about 500° F. and at a pressure of about 2450 psia to about 2850 psia into medium-temperature gases and hydrotreated, medium-temperature liquid. The medium-temperature gases are withdrawn from the MT separator through a medium-temperature gas line 278. The medium-temperature liquid is discharged from the bottom of the MT separator through a medium-temperature liquid line 280 and conveyed to a medium-temperature flash drum 281.

In the medium-temperature (MT) flash drum 281, the influent medium-temperature liquid is separated and flashed into medium-temperature vapors and effluent medium-temperature, hydrotreated liquid. The medium-temperature flash vapors are withdrawn from the MT flash drum through a medium-temperature overhead line 222 and injected, blended, and mixed with the high-temperature overhead flash gases and vapors in the combined, common flash line 224 before being cooled in heat exchanger 226 and conveyed to the LT flash drum 230. The effluent medium-temperature liquid is discharged from the MT flash drum 281 through a light oil discharge line 236 and is injected, blended, and mixed with the low-temperature liquid from the LT flash drum in combined, common light oil liquid line 238 before being heated in the light oil heater 240 and conveyed to the atmospheric tower 82.

In the MT separator 276, the medium-temperature effluent gases exit the MT separator through an MT gas line 278 and are cooled in a medium-temperature (MT) feed gas heat exchanger 282 which also preheats the feed gas before the feed gas is subsequently heated in the HT heat exchanger 272 and the hydrogen heater 78. The cooled medium-temperature gases exit the MT heat exchanger 282 through a medium-temperature (MT) gas line 282 and are combined, blended and intermixed with compressed gas from an anti-surge line 284 in a combined, common gas line 286. The gas and vapors in gas line 286 are blended, diluted and partially dissolved with wash water line 290, in a combined water gas inlet line 292. Ammonia and hydrogen sulfide in the tail gases react to form ammonium bisulfide which dissolves in the injected water. The gas and water products in line 292 are cooled in an air cooler 294 and conveyed through a sponge absorber feed line 296 into a sponge oil absorber and low-temperature (LT) separator 106.

Lean sponge oil is fed into the sponge oil absorber 106 through a lean sponge oil line 300. In the sponge oil absorber, the lean sponge oil and the influent tail gases are circulated in a countercurrent extraction flow pattern. The sponge oil absorbs, extracts, and separates a substantial amount of methane and ethane and most of the $C_3$, $C_4$, $C_5$, and $C_6$+light hydrocarbons (propane, butane, pentane, hexane, etc.) from the influent product stream. The sponge oil absorber operates at a temperature of about 130° F. and at a pressure of about 2700 psia. The effluent gases comprising hydrogen, methane, ethane, and hydrogen sulfide are withdrawn from the sponge oil absorber through a sponge oil effluent gas line 302 and fed into a high-pressure (HP) amine absorber 304.

Effluent water containing ammonium bisulfide is discharged from the bottom of the sponge oil absorber 106 through an effluent water line 306 and conveyed to a sour water flash drum, a sour water degassing drum, and/or other wastewater purification equipment and recycled or discharged.

Rich sponge oil effluent containing $C_3$, $C_4$, $C_5$, and $C_6$+absorbed light hydrocarbons is discharged from the bottom portion of the sponge absorber 106 through a rich sponge oil line 308 and conveyed to a sponge oil flash drum 102. Vacuum naphtha and/or middle distillate can also be fed into the sponge oil (SO) flash drum through a sponge-oil naphtha line 312 as a stream to keep a level in the sponge oil system. In the sponge oil flash drum 102, the rich sponge oil is flashed and separated into light hydrocarbon gases and lean sponge oil. The flashed light hydrocarbon gases are withdrawn from the SO flash drum 102 through a gas line 314 and conveyed downstream for further processing. Lean sponge oil is discharged from the SO flash drum 102 through a lean sponge oil discharge line 316 and pumped (recycled) back to the sponge oil absorber via sponge oil pump 318 and line 300. Some of the lean sponge oil can also be used as the liquid quench. The ammonia-lean, $C_3$+lean reactor tail gases containing hydrogen sulfide, hydrogen, methane, and residual amounts of ethane are fed into the high pressure (HP) amine absorber 304 through an amine absorber inlet line 302. Lean amine from the sulfur recovery unit (SRU) 319 lean amine discharge line 320 is pumped into the HP amine absorber 304 by a lean amine pump 322 through a lean amine inlet line 324. In the HP amine absorber 304, lean amine and influent tail gases are circulated in a countercurrent extraction flow pattern at a pressure of about 2500 psia. The lean amine absorbs, separates, extracts, and removes substantially all the hydrogen sulfide from the influent tail gases.

Rich amine containing hydrogen sulfide is discharged from the bottom of the HP amine absorber 304 through a rich amine line 326 and conveyed to a low-pressure (LP) amine absorber 328. The lean amine absorber 328. The lean amine from the sulfur recovery unit is recycled back to the high-pressure and low-pressure amine absorbers through the lean amine line. Skimmed oil recovered in the HP amine absorber 304 is discharged from the bottom of the HP amine absorber through a high-pressure (HP) skimmed oil line 330 and passed to the LP amine absorber 328. Lean amine from the sulfur recovery unit (SRU) 319 is also pumped into the LP amine absorber 328 through a LP lean amine inlet line 332.

In the LP amine absorber 328, the influent products are separated into gases, rich amine, and skimmed oil. Gases are withdrawn from the LP amine absorber 328 through a gas line 334 and conveyed downstream through line 336 for use as sweet fuel or added to the fresh makeup gas through auxiliary gas line 338. Rich amine is discharged from the LP amine absorber 328 through a rich amine discharge line 340 and conveyed to a sulfur recovery unit (SRU) 319. Skimmed oil can also be withdrawn from the LP amine absorber and conveyed to the SRU 319 through line 340 or a separate line. The sulfur recovery unit can take the form of a Claus plant, although other types of sulfur recovery units can also be used. Sulfur recovered from the tail gases are removed by the tail gas cleanup equipment through sulfur recovery line 342.

In the HP amine absorber 304 of FIG. 8, the lean amine influent absorbs, separates, extracts and removes hydrogen sulfide from the influent stream leaving upgraded reactor tail gases (off gases). The upgraded reactor tail gases comprise about 70% to about 80% by volume hydrogen and about 20% to 30% by volume methane, although residual amounts of ethane may be present. The upgraded reactor tail gases are withdrawn from the high-pressure amine absorber through an overhead, upgraded tail gas line 350 and conveyed to a recycle compressor 352. The recycle compressor increases the pressure of the upgraded tail gases. The compressed tail gases are discharged from the compressor through a compressor outlet line 354. Part of the compressed gases can be passed through an anti-surge line 284 and injected into the combined gas line 286 to control the inventory, flow and surging of the medium-temperature gases being conveyed to the sponge oil absorber 106. Other portions of the gases prior to compression can be bled off through a bleed line or spill line 356 and used for fuel gas or for other purposes as discussed below.

Fresh makeup gases comprising at least about 95% hydrogen, preferably at least 96% hydrogen, by volume, from a hydrogen plant are conveyed through fresh makeup gas lines 358, 360, and 362 (FIG. 8) by a makeup gas compressor 364, along with gas from gas line 338, and injected, mixed, dispersed, and blended with the main portion of the compressed upgraded tail gases in a combined, common feed gas line 366. The ratio of fresh makeup gases to compressed recycle tail gases in the combined feed gas line 366 can range from about 1:2 to about 1:4.

About 10% by volume of the blended mixture of compressed, upgraded, recycled reactor tail gases (upgraded effluent off gases) and fresh makeup hydrogen gases in combined feed gas line 366 are bled off through a quench line 368 for use as quench gases. The quench gases are injected into the second and third ebullated bed reactors through the second reactor inlet quench line 170 and the third reactor inlet quench line 174 and are injected into the effluent hydrotreated product stream exiting the third reactor through quench line 208.

The remaining portion, about 90% by volume, of the blended mixture of compressed, upgraded, recycled, reactor tail gases (upgraded off gases) and fresh makeup gases in the combined feed gas line 366 comprise the feed gases. The feed gases in the combined feed gas line 366 are preheated in a medium-temperature (MT) heat exchanger 282 (FIG. 8) and passed through a heat exchanger line 370 to a high-temperature (HT) heat exchanger 272 where the feed gases are further heated to a higher temperature. The heated feed gases are discharged from the HT heat exchanger 272 through a discharge line 194 and passed through a hydrogen heater 78 which heats the feed gases to a temperature ranging from about 650° F. to about 900° F. The heated hydrogen-rich feed gases exit the hydrogen heater 78 through a feed gas line 196 and are injected (fed) through an oil-gas line 76 into the first ebullated bed reactor 70.

Heavy coker gas oil from line 372 (FIG. 7), light vacuum gas oil from the light vacuum gas oil line 158 (FIG. 8), and/or heavy vacuum gas oil from the heavy vacuum gas oil lines 268 (FIG. 8) or 48 (FIG. 6) and possibly solvent extracted oil 172 (FIG. 7) are conveyed into an optional catalytic feed hydrotreater or catalytic feed hydrotreating unit (CFHU) 162 (FIG. 7) where it is hydrotreated with hydrogen from hydrogen feed line 380 at a pressure ranging from atmospheric pressure to 2000 psia, preferably from about 1000 psia to about 1800 psia at a temperature ranging from 650° F. to 750° F. in the presence of a hydro-treating catalyst. The hydrotreated gas oil is discharged through a catalytic feed hydrotreater discharge line 382.

Figure 9:
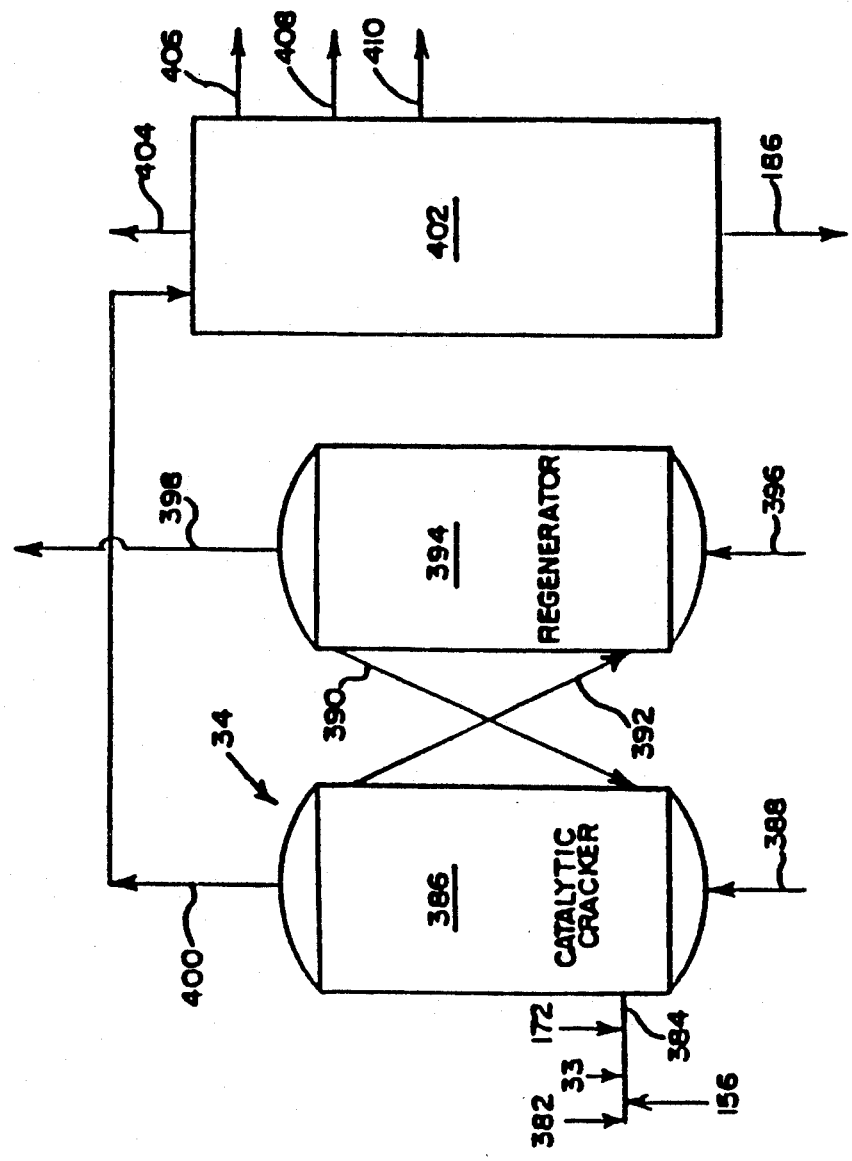
FIG. 9 is a schematic flow diagram of a catalytic cracking unit.

Solvent-extracted deasphalted oil in SEU oil line 172 (FIG. 9) is fed and conveyed via a combined catalytic feed line 384 in the bottom portion of a catalytic cracking (FCC) reactor 386 of a fluid catalytic cracker (FCC) unit 34. Catalytic feed hydrotreated oil in line 382 and light atmospheric gas oil in RHU LGO gas oil line 156 and/or primary gas oil in line 33 from the primary tower 26 (pipestill) (FIG. 3) can also be fed and conveyed via combined catalytic feed line 384 into the bottom portion of the catalytic cracking reactor 386. Kerosene can be withdrawn from the catalytic feed hydrotreating unit 162 (FIG. 7) through CFHU kerosene line 387.

The catalytic cracking reactor 386 (FIG. 9) can have a stripper section. Preferably, the catalytic cracking reactor comprises a riser reactor. In some circumstances, it may be desirable to use a fluid bed reactor or a fluidized catalytic cracking reactor. Fresh makeup catalytic cracking catalyst and regenerated catalytic cracking catalyst are fed into the reactor through a fresh makeup and regenerated catalyst line 390, respectively. In the FCC reactor, the hydrocarbon feedstock is vaporized upon being mixed with the hot cracking catalyst and the feedstock is catalytically cracked to more valuable, lower molecular weight hydrocarbons. The temperatures in the reactor 386 can range from about 900° F. to about 1025° F. at a pressure from about 5 psig to about 50 psig. The circulation rate (weight hourly space&velocity) of the cracking catalyst in the reactor 386 can range from about 5 to about 200 WHSV. The velocity of the oil vapors in the riser reactor can range from about 5 ft/sec to about 100 ft/sec.

Spent catalyst containing deactivating deposits of coke is discharged from the FC reactor 386 (FIG. 9) through spent catalyst line 392 and fed to the bottom portion of an upright, fluidized catalyst regenerator or combustor 394. The reactor and regenerator together provide the primary components of the catalytic cracking unit. Air is injected upwardly into the bottom portion of the regenerator through an air injector line 396. The air is injected at a pressure and flow rate to fluidize the spent catalyst particles generally upwardly within the regenerator. Residual carbon (coke) contained on the catalyst particles is substantially completely combusted in the regenerator leaving regenerated catalyst for use in the reactor. The regenerated catalyst is discharged from the regenerator through regenerated catalyst line 390 and fed to the reactor. The combustion off-gases (flue gases) are withdrawn from the top of the combustor through an overhead combustion off-gas line or flue gas line 398.

Suitable cracking catalyst include, but are not limited to, those containing silica and/or alumina, including the acidic type. The cracking catalyst may contain other refractory metal oxides such as magnesia or zirconia. Preferred cracking catalysts are those containing crystalline aluminosilicates, zeolites, or molecular sieves in an amount sufficient to materially increase the cracking activity of the catalyst, e.g., between about 1 and about 25% by weight. The crystalline aluminosilicates can have silica-to-alumina mole ratios of at least about 2:1, such as from about 2 to 12:1, preferably about 4 to 6:1 for best results. The crystalline aluminosilicates are usually available or made in sodium form and this component is preferably reduced, for instance, to less than about 4 or even less than about 1% by weight through exchange with hydrogen ions, hydrogen-precursors such as ammonium ions, or polyvalent metal ions. Suitable polyvalent metals include calcium, strontium, barium, and the rare earth metals such as cerium, lanthanum, neodymium, and/or naturally-occurring mixtures of the rare earth metals. Such crystalline materials are able to maintain their pore structure under the high temperature conditions of catalyst manufacture, hydrocarbon processing, and catalyst regeneration. The crystalline aluminosilicates often have a uniform pore structure of exceedingly small size with the cross-sectional diameter of the pores being in the size range of about 6 to 20 angstroms, preferably about 10 to 15 angstroms. Silica-alumina based cracking catalysts having a major proportion of silica, e.g., about 60 to 90 weight percent silica and about 10 to 40 weight percent alumina, are suitable for admixture with the crystalline aluminosilicate or for use as such as the cracking catalyst. Other cracking catalysts and pore sizes can be used. The cracking catalyst can also contain or comprise a carbon monoxide (CO) burning promoter or catalyst, such as a platinum catalyst to enhance the combustion of carbon monoxide in the dense phase in the regenerator 394.

The effluent product stream of catalytically cracked hydrocarbons (volatized oil) is withdrawn from the top of the FCC reactor 386 (FIG. 9) through an overhead product line 400 and conveyed to the FCC main fractionator 402. In the FCC fractionator 402, the catalytically cracked hydrocarbons comprising oil vapors and flashed vapors can be fractionated (separated) into light hydrocarbon gases, naphtha, light catalytic cycle oil (LCCO), heavy catalytic cycle oil (HCCO), and decanted oil (DCO). Light hydrocarbon gases are withdrawn from the FCC fractionator through a light gas line 404. Naphtha is withdrawn from the FCC fractionator through a naphtha line 406. LCCO is withdrawn from the FCC fractionator through a light catalytic cycle oil line 408. HCCO is withdrawn from the FCC fractionator through a heavy catalytic cycle oil line 410. Decanted oil is withdrawn from the bottom of the FCC fractionator through a decanted oil line 186.

In order to help minimize and decrease the concentration of carbonaceous asphaltenic solids formed during resid hydrotreating, some of the decanted oil from the decanted oil line 186 can be injected into the combined feed line 182 (FIG. 8) as part of the feedstock being fed to the ebullated bed reactor 70. Alternatively or in addition thereto, some of the decanted oil from line 186 can be fed into the atmospheric tower 82 via atmospheric decanted oil line 412 and/or into the vacuum tower 84 via vacuum decanted oil line 414 to minimize precipitation and conglomeration of asphaltenic solids in the towers 82 and 84. For best results, the total amount of diluent (decanted oil) injected into the atmospheric and vacuum towers 82 and 84 ranges from about 5% to less than 20%, and preferably from about 7% to about 12%, by weight of the influent resid oil feedstock.

Alternatively, in the main fractionator 402, the oil vapors and flashed vapors can be fractionated (separated) into: (a) light hydrocarbons having a boiling temperature less than about 430° F.; (b) light catalytic cycle oil (LCCO); and (c) decanted oil (DCO). The light hydrocarbons can be withdrawn from the main fractionator through an overhead line and fed to a separator drum. In the separator drum, the light hydrocarbons can be separated into: (1) wet gas; and (2) $C_3$ to 430° F. light hydrocarbon material comprising propane, propylene, butane, butylene, and naphtha. The wet gas can be withdrawn from the separator drum through a wet gas line and further processed in a vapor recovery unit (VRU). The $C_3$ to 430° F. material can be withdrawn from the separator drum through a discharge line a passed to the vapor recovery unit (VRU) for further processing. LCCO can be withdrawn from the main fractionator through an LCCO line for further refining, processing, or marketing. Decanted oil (DCO) can be withdrawn from the main fractionator through one or more DCO lines for further use. Slurry recycle comprising DCO can be pumped from the bottom portion of the main fractionator by pump through a slurry line for recycle to the catalytic reactor. Other portions of the DCO can be fed to the resid hydrotreating unit 60 and/or the fractionating towers 82 and 84 a described previously. The remainder of the DCO can be conveyed through for further use in the refinery.

Spent deactivated (used) coked catalyst can be discharged from the catalytic cracking reactor and stripped of volatilizable hydrocarbons in the stripper section with a stripping gas, such as with light hydrocarbon gases or steam. The stripped coked catalyst is passed from the stripper through spent catalyst line into the regenerator. Air is injected through an air injector line into the regenerator 22 at a rate of about 0.2 ft/sec to about 4 ft/sec. Preferably, excess air is injected in the regenerator to completely convert the coke on the catalyst to carbon dioxide and steam. The excess air can be from about 2.5% to about 25% greater than the stoichiometric amount of air necessary for the complete conversion of coke to carbon dioxide and steam.

Those who are skilled in the art will readily perceive how to modify the invention. Therefore, the appended claims are to be construed to cover all equivalent structures which fall within the true scope and spirit of the invention.

We claim:

1. A process for refining low sulfur resids, in a resid hydrotreating unit comprising two cascaded solvent separator stages, said process comprising the steps of:
    (a) feeding low sulfur resid and solvent into a first of said two separate stages;
    (b) separating the low sulfur reside and solvent into a heavier fraction and a lighter fraction;
    (c) hydrotreating the heavier fraction from said first stage;
    (d) transferring the lighter fraction from said first stage to a second stage of said two separator stages;
    (e) operating said second stage at a temperature which separates said solvent from oil fractions;
    (f) recycling at least some of said separated solvent from said second stage to said first stage; and (g) forwarding said separated oil fraction from said second stage as a feed stream for further processing.

2. The process of claim 1 and the added step of transferring said lighter fraction of step (c) from said first separator stage through a heat exchanger means to said second separator stage for transferring heat from said recycled solvent to said lighter fraction while it is being simultaneously transferred from said first stage to said second stage.

3. The process of claim 1 wherein said heavier fraction comprises at least one of resins and asphaltene, and the added steps of hydrotreating and then fractionating said heavier fraction, and recycling a portion of said fractionated heavier stock to rejoin said low sulfur resid of step (a).

4. The process of claim 3 wherein said fractionating step separates said resins and asphaltenes into at least light gases, naphtha, distillates, gas oil, and a hydrotreated resid, and the added step of transferring at least some of said hydrotreated resid to a coker.

5. The process of claim 1 wherein said solvent is a $C_3$-$C_5$ alkane.

6. The process of claim 1 wherein said solvent is normal butane.

7. The process of claim 6 and the added step of operating said first separator at a temperature in a range extending from about 100° F. below a critical point to approximately a critical point of said solvent.

8. The process of claim 6 and the added step of operating said first separator at a temperature approximately 40° F. below the critical point of said solvent.

9. The process of claim 7 and the added step of operating said second separator at a temperature in a range extending from less than about 50° F. over a critical temperature of said solvent to about 100° F. above the critical temperature of said solvent.

10. The process of claim 1 and the added step of separating said solvent from said oil in said second stage and further removing metals and heteroatoms and saturating olefins and aromatics in a catalytic feed hydrotreater.

11. The process of claim 10 and the added step of operating said catalytic feed hydrotreater as a fixed bed reactor at about 650°-700° F., 0.5-2 LHSV, 500-1500 psi hydrogen catalysts, and 500-3000 SCFB gas rate.

12. The process of claim 11 and the added step of using a catalyst in said catalytic feed hydrotreater, said catalyst being taken from a group consisting of NiMo, CoMo, and NiW catalysts.

13. The process of claim 10 and the added step of hydrotreating said heavier fraction in an ebullated bed operating at about 1000-5000 psi hydrogen at temperatures of about 750°-850° F.

14. The process of claim 10 and the added step of hydrotreating said heavier fraction in an ebullated bed operating at about 2000-3000 psi hydrogen at temperatures of about 780°-820° F.

15. A process for refining low sulfur resides in association with a resid hydrotreating unit, said process comprising the steps of:
a) forwarding a first stage input feedstream to at least two solvent separator stages, said input feedstreams forming a mixture of low sulfur resid and solvents;
b) separating said mixed feedstream into a heavy fraction comprising resins and asphaltenes and a light fraction comprising low sulfur oil and said solvent;
c) forwarding the separated heavy fraction from a first of said separator stages to a hydrotreater and fractionator;
d) forwarding the separated light fraction from a first of said separator stages to a second stage for separation into solvent and oil; and
e) forwarding said oil separated in step (d) to a catalytic cracker or a catalytic feed hydrotreater.

16. A process for using a low sulfur resid and hydrotreated resid as an input feedstream to a resid hydrotreating unit, said process comprising steps of:
(a) forwarding a low sulfur resid feedstream to a first mixer where fresh solvent is mixed into said feedstream;
(b) separating and withdrawing solvent-extracted asphaltenes and resins containing organometallic components in a first solvent separator which is operated at temperatures which separate at least asphaltenes from solvents and oils;
(c) withdrawing and forwarding lighter components from said first separator to a second solvent separator operated at an elevated temperatures to separate oil from solvent, the pressure in said second additional separator being at least the critical pressure of said fresh solvent;
(d) withdrawing said solvent from said second additional separator;
(e) withdrawing and forwarding heavier fractions separated in step (b) from said first separator to a second mixer for adding a second different fresh solvent thereto;
(f) forwarding the mixture from step (e) to a third solvent separator operating below the critical temperature of the solvent;
(g) withdrawing and forwarding resins of hydrotreated resid from the third separator to a fourth solvent separator;
(h) collecting a lighter phase from said fourth separator; and
(i) collecting a heavier resin-rich phase from said fourth separator and hydrotreating the heavier phase in a resid hydrotreating unit.

17. The process of claim 16 wherein said solvent is normal butane, means for operating said first separator at a temperature in a range extending from about 100° F. below a critical point to a critical point of said solvent, and means for operating said second separator at a temperature in a range extending from less than 50° F. over to 100° F. above the critical pressure of said solvent.

18. A hydrotreating process comprising the steps of:
(a) substantially desalting crude oil;
(b) heating said desalted crude oil in a pipestill furnace;
(c) pumping said heated crude oil to a primary distillation tower;
(d) separating said heated crude oil in said primary distillation tower into streams of naphtha, kerosene, primary gas oil, and primary reduced crude oil;
(e) pumping said primary reduced crude oil to a pipestill vacuum tower;
(f) separating said primary gas oil in said pipestill vacuum tower into streams of wet gas, heavy gas oil, and vacuum reduced crude oil providing resid oil;
(g) at least some of said resid oil being a low sulfur resid; deasphalting at least said low sulfur resids in at least two cascaded solvent separator stages by feeding low sulfur resid and solvent into a first of said two solvent separate stages; hydrotreating a heavier fraction from said first stage; transferring a lighter fraction from said first stage to a second of said two solvent separation stages; operating said second stage at a temperature which separates said solvent from oil fractions; and recycling at least some of said separated solvent from said second stage to said first stage;

(h) feeding said lighter oil fraction from step (g) to a fluid catalytic cracker, or a catalytic feed hydrotreating unit;

(i) feeding a resid oil feedstream comprising virgin high sulfur resid from step (f) and the heavy extract of low sulfur from step (g) to a resid hydrotreating unit comprising a series of three ebullated bed reactors;

(j) injecting hydrogen-rich gases into said ebullated bed reactors;

(k) conveying resid hydrotreating catalysts to said ebullated bed reactors;

(l) ebullating said feed comprising said solvent-extracted resins and said resid oil with said hydrogen-rich gases in the presence of said resid hydrotreating catalyst in said ebullated bed reactors under hydrotreating conditions to produce upgraded hydrotreated resid oil;

(m) separating at least a portion of said hydrotreated resid oil in an atmospheric tower into atmospheric streams of distillate, atmospheric gas oil, and atmospheric tower bottoms comprising atmospheric resid oil; and (n) separating said atmospheric resid oil in a resid vacuum tower into vacuum streams of vacuum gas oil and vacuum tower bottoms comprising vacuum resid oil.

19. The process of claim 18 and the added steps of:

(o) conveying and feeding a substantial portion of said vacuum tower bottoms from said resid vacuum tower to a multistage solvent extraction unit;

(p) feeding a solvent to said multistage solvent extraction unit, said solvent comprising a member selected from the group consisting of butane and pentane;

(q) substantially deasphalting and solvent-extracting said vacuum tower bottoms with said solvent in said multistage solvent extraction unit to substantially separate said vacuum tower bottoms into streams of substantially deasphalted solvent-oil, substantially deasphalted solvent-extracted resins, and substantially deresined solvent-extracted asphaltenes;

(r) recovering said solvent under supercritical conditions and recycling said solvent to said solvent extraction unit;

(s) transporting at least some of said solvent-extracted asphaltenes for use as solid fuel; and (t) conveying said solvent-extracted resins from said solvent extraction unit to said resid hydrotreating unit as part of said resid oil feed.

20. A hydrotreating process for refining low sulfur resids, in a system comprising at least two cascaded solvent separator stages, said process comprising the steps of:

(a) feeding low sulfur resid and solvent into a first of said two solvent separator stages;

(b) separating the low sulfur resid and solvent into a heavier fraction and a lighter fraction;

(c) hydrotreating the heavier fraction from said first stage;

(d) transferring the lighter fraction from said first stage to a second of said two solvent separator stages;

(e) operating said second stage at a temperature which separates said solvent from oil fractions;

(f) feeding said oil fraction from step (e) to a fluid catalytic cracker or a catalytic feed hydrotreating unit;

(g) recycling at least some of said separated solvent from said second stage to said first stage;

(h) feeding a first stream comprising resid and said heavier fraction from step (c) to an ebullated bed reactor;

(i) feeding a second stream comprising recycled substantially deasphalted resins to said reactor;

(j) feeding hydrotreating catalyst to said reactor;

(k) injecting hydrogen-rich gases into said reactor;

(l) hydrotreating said first stream comprising resid and said second stream comprising recycled resins with said hydrogen-rich gases in the presence of said hydrotreating catalyst under hydrotreating conditions to produce hydrotreated oil;

(m) fractionating said hydrotreated oil in at least one fractionator selected from the group consisting of an atmospheric tower and a vacuum tower to produce gas oil and resid bottoms;

(n) substantially separating said resid bottoms into one stream comprising asphaltenes and said second stream comprising said substantially deasphalted resins; and (o) recycling said second stream comprising said recycled deasphalted resins to said reactor.

* * * * *

UNITED STATES PATENT AND TRADEMARK OFFICE
CERTIFICATE OF CORRECTION

PATENT NO.: 5,242,578

DATED: September 7, 1993

INVENTOR(S): James L. Taylor, Jeffrey J. Kolstad, William I. Beaton

It is certified that error appears in the above-identified patent and that said Letters Patent is hereby corrected as shown below:

Patent reads:

| Col. | Line | |
|------|------|---|
| 5 | 39 | "ebullated bed reactor" should read --ebullated bed reactors-- |
| 15 | 31 | "the third reactor discharge line 20" should read --the third reactor discharge line 202-- |
| 20 | 51 | "the FC reactor 386" should read --the FCC reactor 386-- |
| 22 | 59 | "(b) separating the low sulfur reside" should read --(b) separating the low sulfur resid-- |
| 23 | 46 | "hydrogen catalysts," should read --hydrogen pressure,-- |

Signed and Sealed this

Thirty-first Day of May, 1994

Attest:

BRUCE LEHMAN

Attesting Officer     Commissioner of Patents and Trademarks